(12) United States Patent
Sconza et al.

(10) Patent No.: US 12,499,866 B2
(45) Date of Patent: Dec. 16, 2025

(54) ADAPTIVE ACOUSTIC ECHO CANCELLATION FOR A STEREO AUDIO SIGNAL

(71) Applicant: SHURE ACQUISITION HOLDINGS, INC., Niles, IL (US)

(72) Inventors: Justin Sconza, Chicago, IL (US); Bijal Joshi, Elk Grove Village, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 303 days.

(21) Appl. No.: 18/067,146

(22) Filed: Dec. 16, 2022

(65) Prior Publication Data

US 2023/0197051 A1  Jun. 22, 2023

Related U.S. Application Data

(60) Provisional application No. 63/290,814, filed on Dec. 17, 2021.

(51) Int. Cl.
*G10K 11/178* (2006.01)
*H04M 9/08* (2006.01)

(52) U.S. Cl.
CPC .. *G10K 11/17854* (2018.01); *G10K 11/17823* (2018.01); *H04M 9/082* (2013.01)

(58) Field of Classification Search
CPC ....... G10K 11/17854; G10K 11/17823; H04M 9/082; H04R 5/04; H04R 3/02
See application file for complete search history.

(56) References Cited

U.S. PATENT DOCUMENTS

| | | | |
|---|---|---|---|
| 5,828,756 A | 10/1998 | Benesty et al. | |
| 6,738,480 B1 | 5/2004 | Berthault et al. | |
| 7,477,735 B2 | 1/2009 | Marton et al. | |
| 8,385,557 B2 | 2/2013 | Tashev et al. | |
| 8,605,890 B2 | 12/2013 | Zhang et al. | |
| 9,123,324 B2 | 9/2015 | Volcker | |
| 9,215,327 B2 * | 12/2015 | Bathurst | H04M 3/002 |

(Continued)

FOREIGN PATENT DOCUMENTS

| | | |
|---|---|---|
| CN | 111292749 A | 6/2020 |
| CN | 112992171 A | 6/2021 |

(Continued)

OTHER PUBLICATIONS

International Search Report and Written Opinion for PCT/US2022/079221 (ISA/US) mailed Feb. 14, 2023 (8 pages).

(Continued)

*Primary Examiner* — Paul Kim
*Assistant Examiner* — Annabelle Kang
(74) *Attorney, Agent, or Firm* — Alston & Bird LLP

(57) ABSTRACT

Techniques for adaptively providing acoustic echo cancellation (AEC) for a stereo audio signal associated with at least one microphone are discussed herein. Some embodiments may include determining, based at least in part on detecting a reference signal associated with a channel sample portion of the stereo audio signal, a panning state of the stereo audio signal. A hard-panned-configured AEC processing filter or a soft-panned-configured AEC processing filter is applied to the stereo audio signal to generate a filtered audio signal output based on the panning state.

20 Claims, 18 Drawing Sheets

(56) References Cited

U.S. PATENT DOCUMENTS

| | | | |
|---|---|---|---|
| 9,232,072 | B2 | 1/2016 | Volcker |
| 9,769,587 | B2 | 9/2017 | Schevciw et al. |
| 10,013,995 | B1 | 7/2018 | Lashkari et al. |
| 11,765,504 | B2 | 9/2023 | Christoph |
| 2009/0046866 | A1 | 2/2009 | Feng et al. |
| 2014/0169568 | A1* | 6/2014 | Li .................... H04R 5/04 381/17 |
| 2017/0226132 | A1 | 8/2017 | Ray et al. |
| 2018/0169072 | A1 | 6/2018 | Morriello et al. |

FOREIGN PATENT DOCUMENTS

| | | |
|---|---|---|
| EP | 1031191 B1 | 8/2006 |
| WO | 1999/053674 A1 | 10/1999 |
| WO | WO 2020/173935 A1 | 9/2020 |
| WO | WO 2021/222556 A1 | 11/2021 |
| WO | 2022/173684 A1 | 8/2022 |

OTHER PUBLICATIONS

International Search Report and Written Opinion Mailed on Jun. 13, 2023 for WO Application No. PCT/US22/081757, 26 page(s).

\* cited by examiner

ADAPTIVE ACOUSTIC ECHO CANCELLATION FOR A STEREO AUDIO SIGNAL

CROSS REFERENCE TO RELATED APPLICATIONS

This application claims the benefit of U.S. Provisional Patent Application No. 63/290,814, titled "ADAPTIVE ACOUSTIC ECHO CANCELLATION FOR A STEREO AUDIO SIGNAL," and filed on Dec. 17, 2021, the entirety of which is hereby incorporated by reference.

TECHNICAL FIELD

Embodiments of the present disclosure relate generally to audio processing and, more particularly, to systems that are configured for providing acoustic echo cancellation for an audio signal.

BACKGROUND

In our rapidly changing electronic communications age, it has become increasing important to identify, isolate, and remove noise from an audio system. Noise impacts intelligibility of audio and produces an undesirable experience for listeners. In certain instances, acoustic feedback (e.g., an echo) between a near-end speaker and a far-end microphone may be introduced. As such, a filtering technique such as acoustic echo cancellation (AEC) may be employed to filter acoustic feedback between a speaker and a microphone.

BRIEF SUMMARY

Various embodiments of the present disclosure are directed to improved apparatuses, systems, methods, and computer readable media for providing adaptive acoustic echo cancellation for a stereo audio signal. These characteristics as well as additional features, functions, and details of various embodiments are described below. The claims set forth herein further serve as a summary of this disclosure.

BRIEF DESCRIPTION OF THE DRAWINGS

Figure 1:
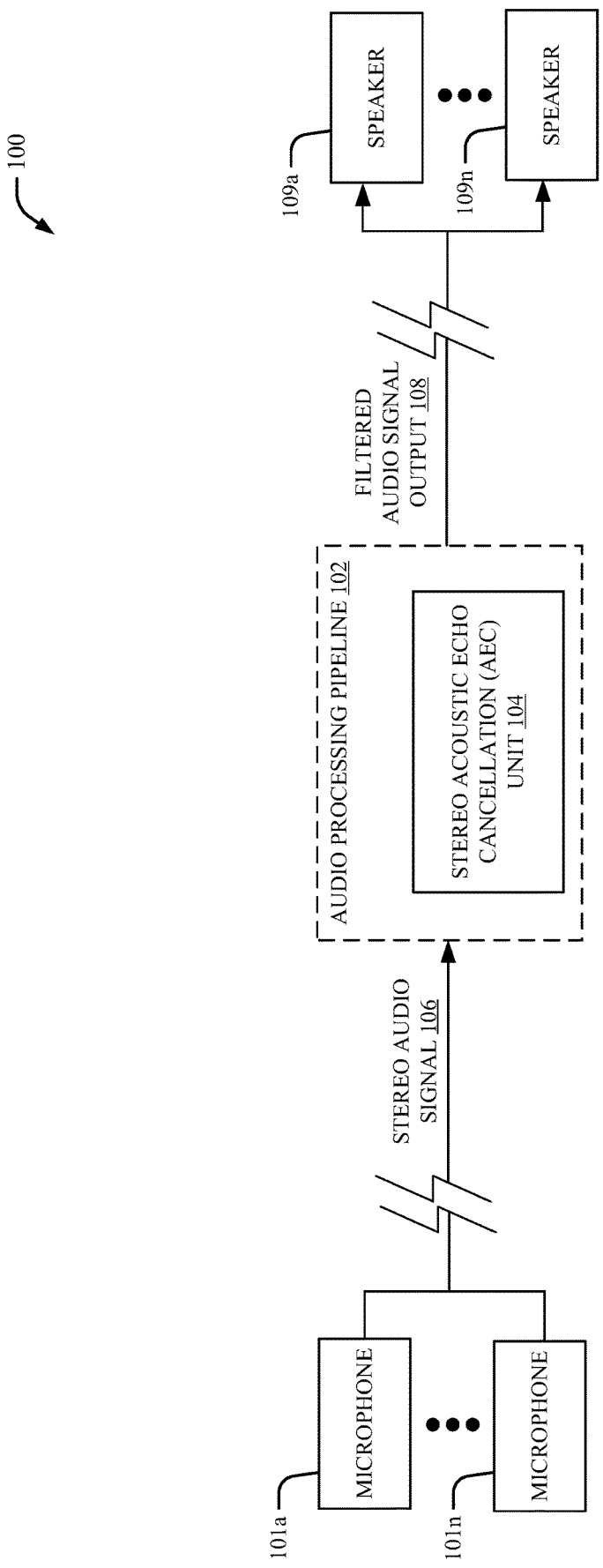
Figure 2:
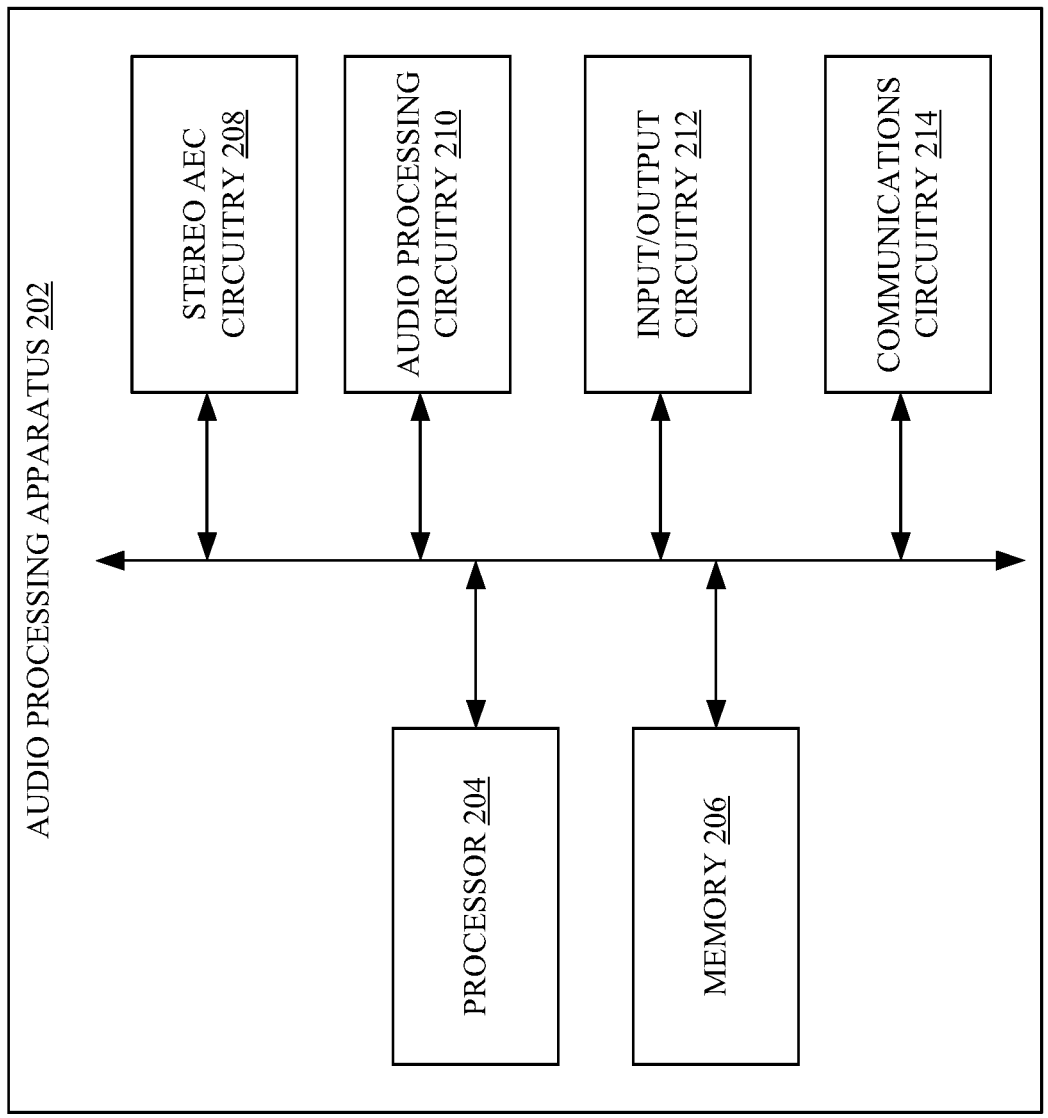
Figure 3:
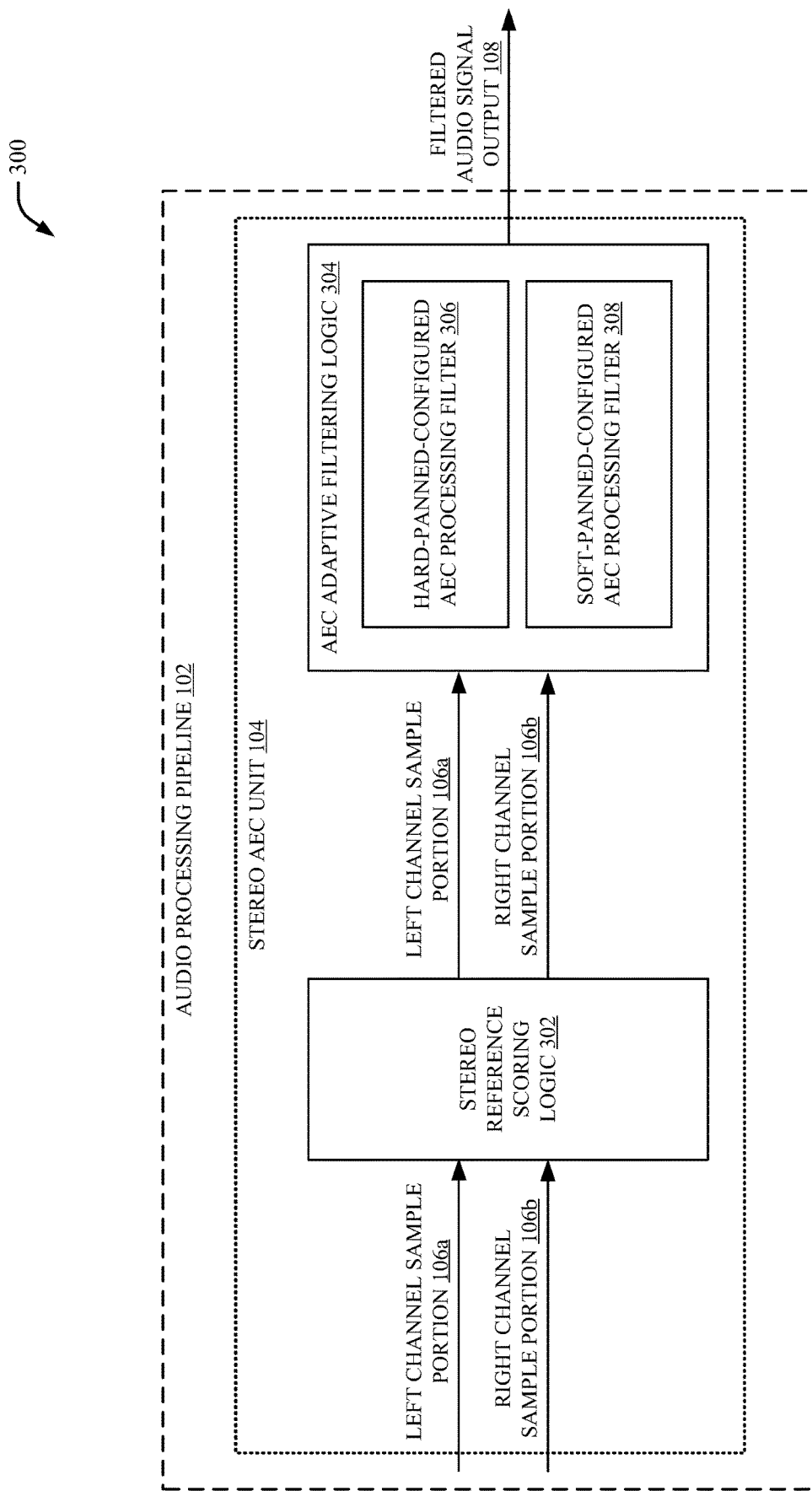
Figure 4:
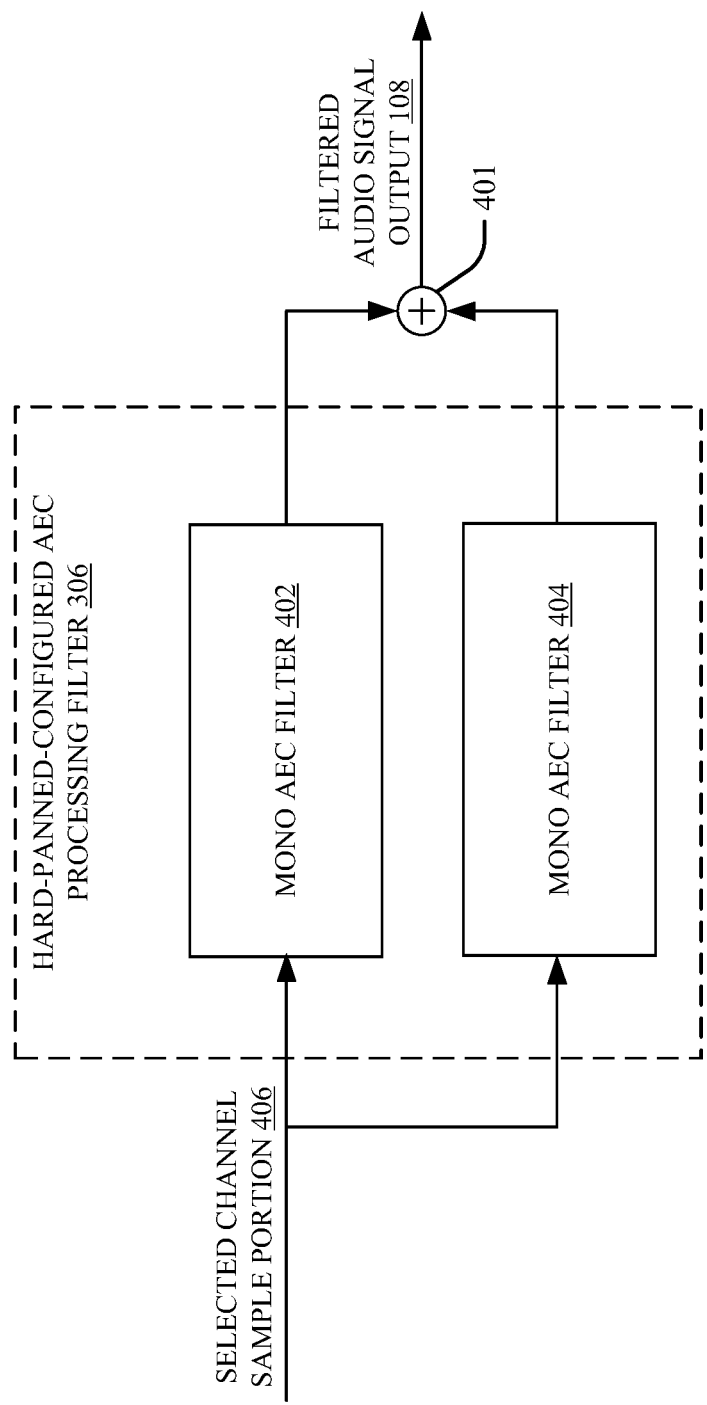
Figure 5:
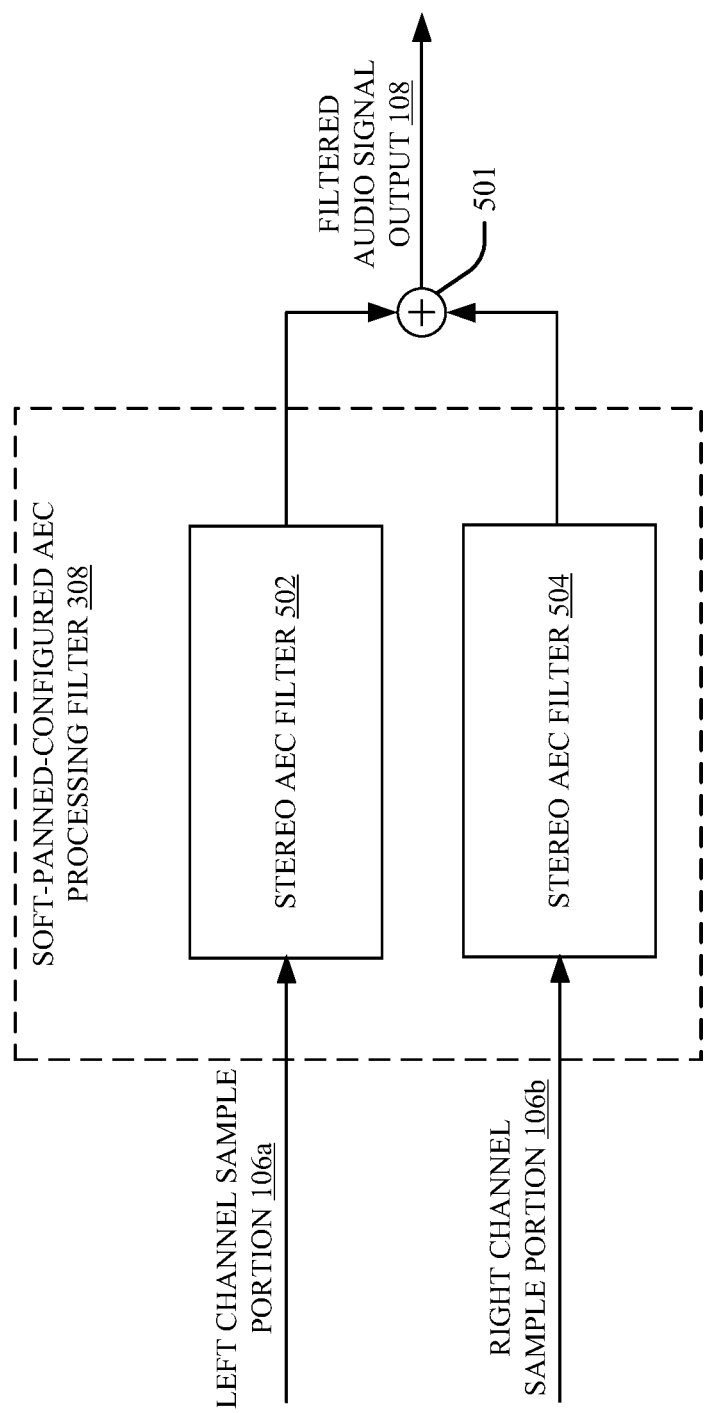
Figure 6:
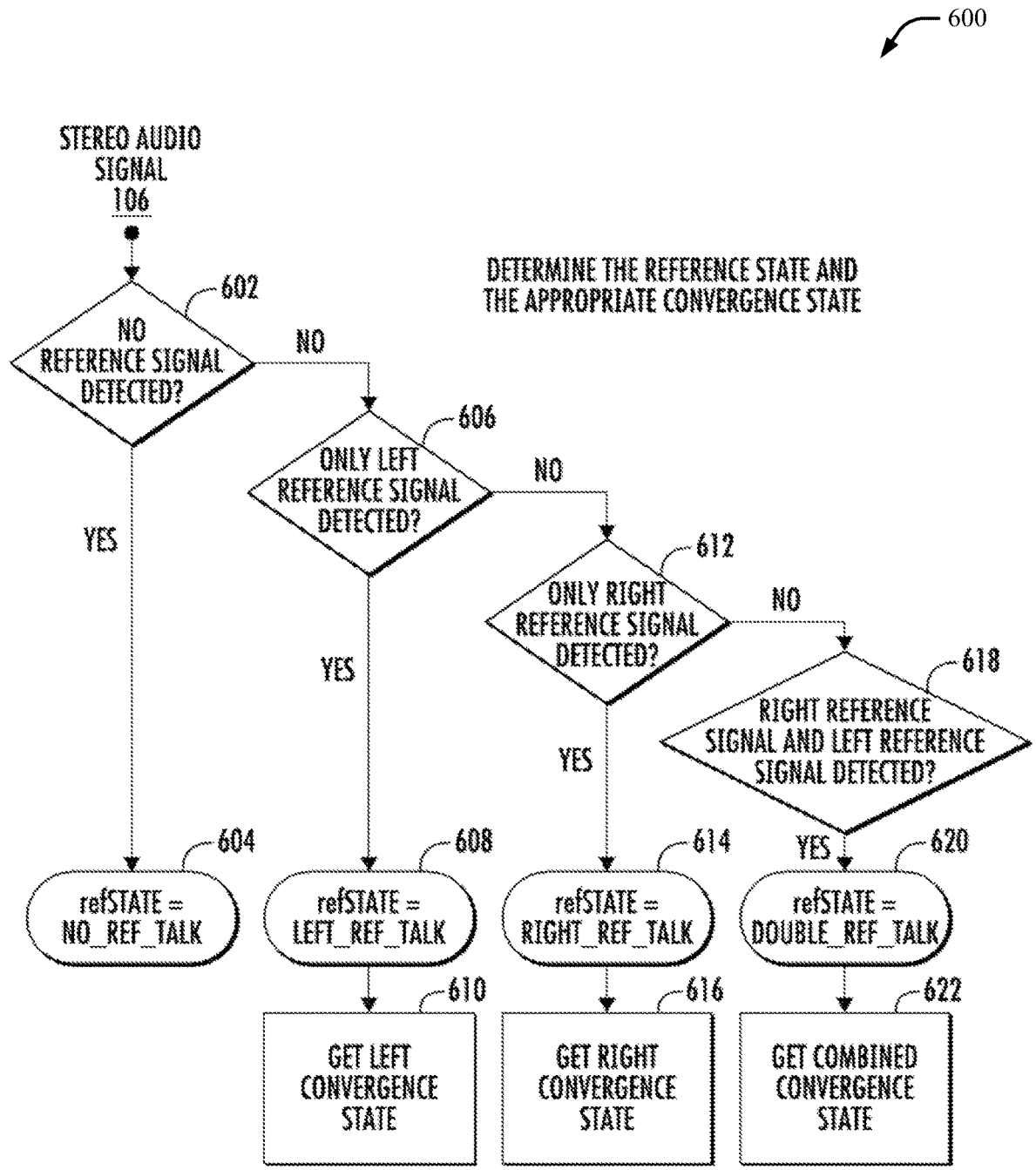
Figure 7:
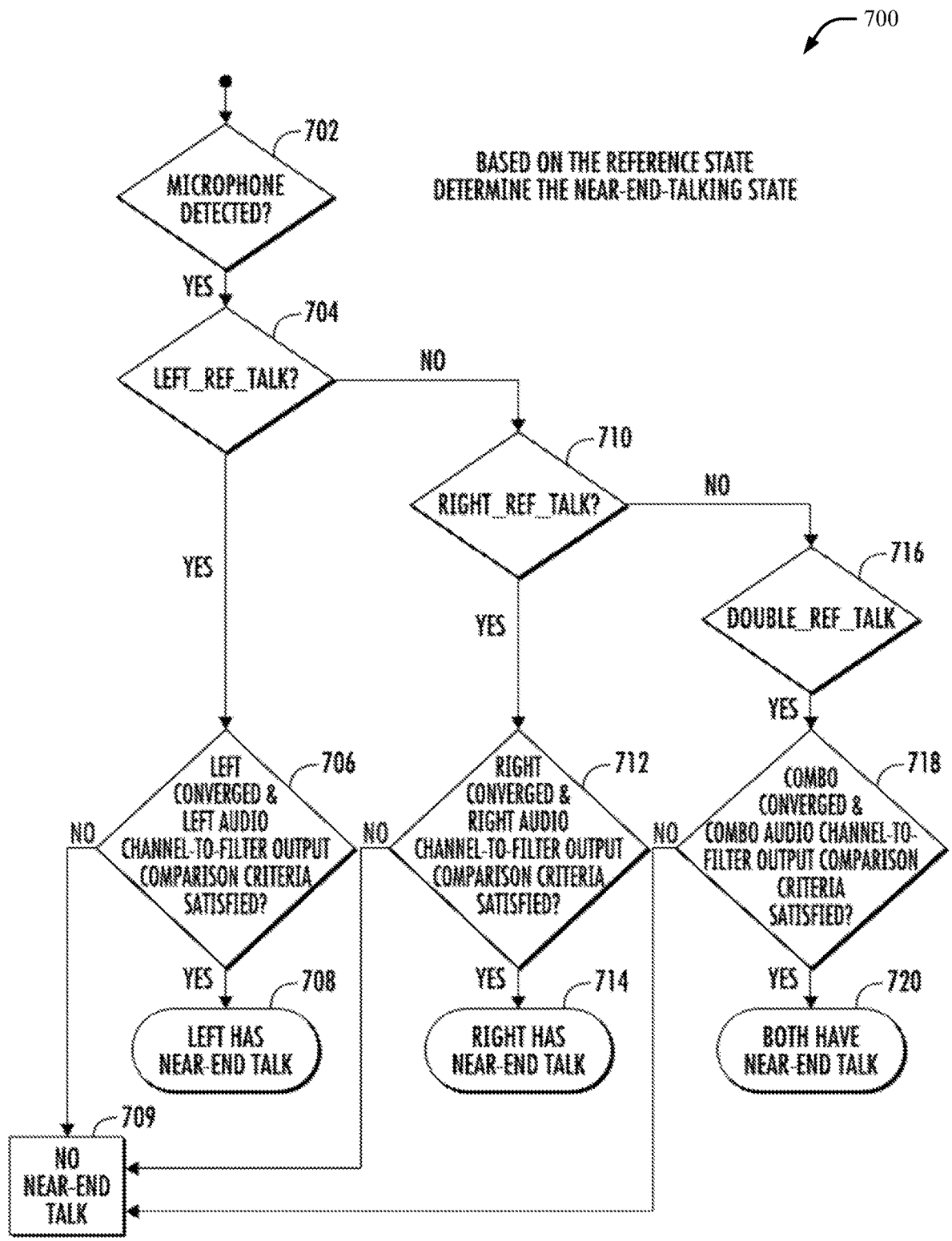
Figure 8:
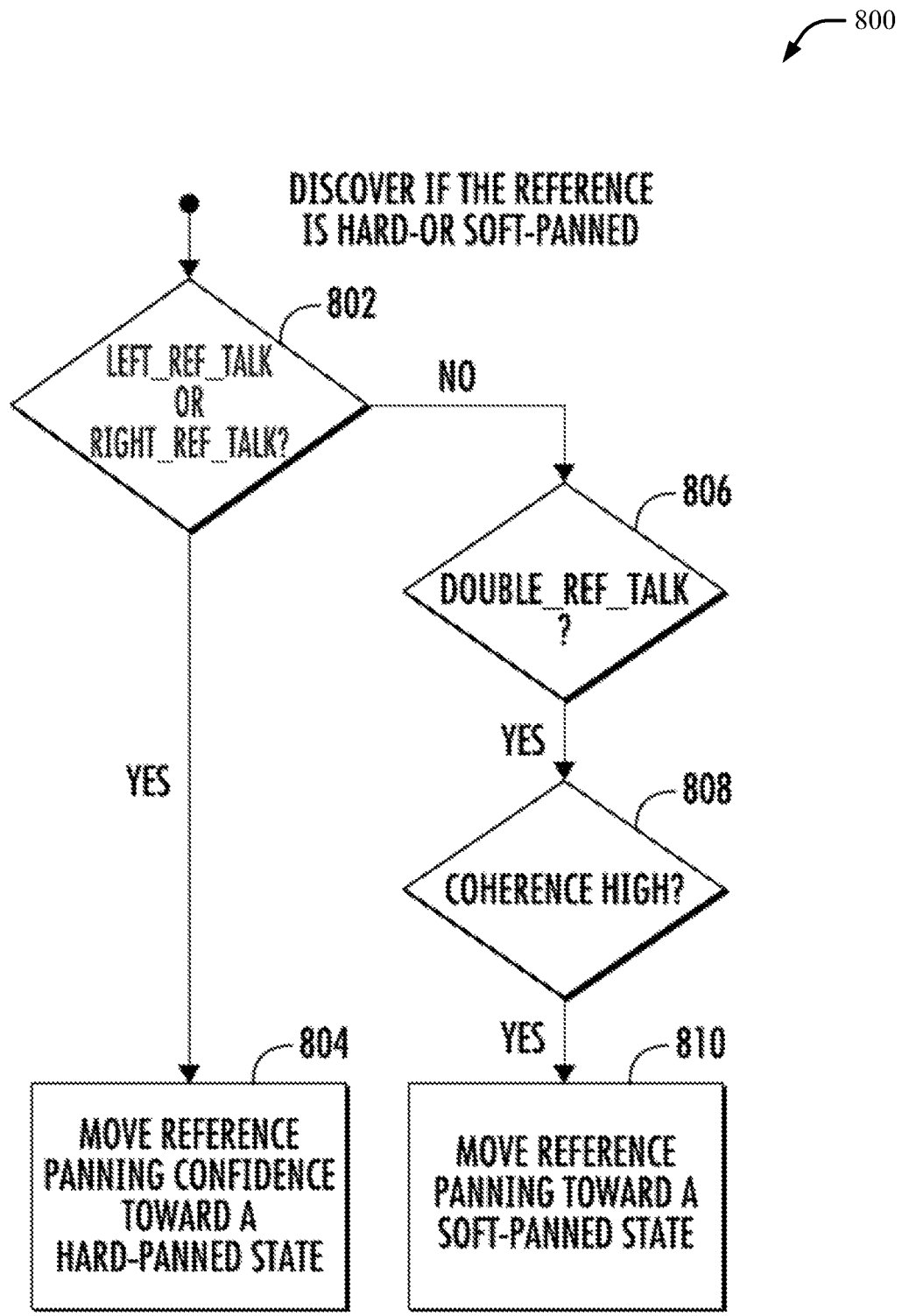
Figure 9:
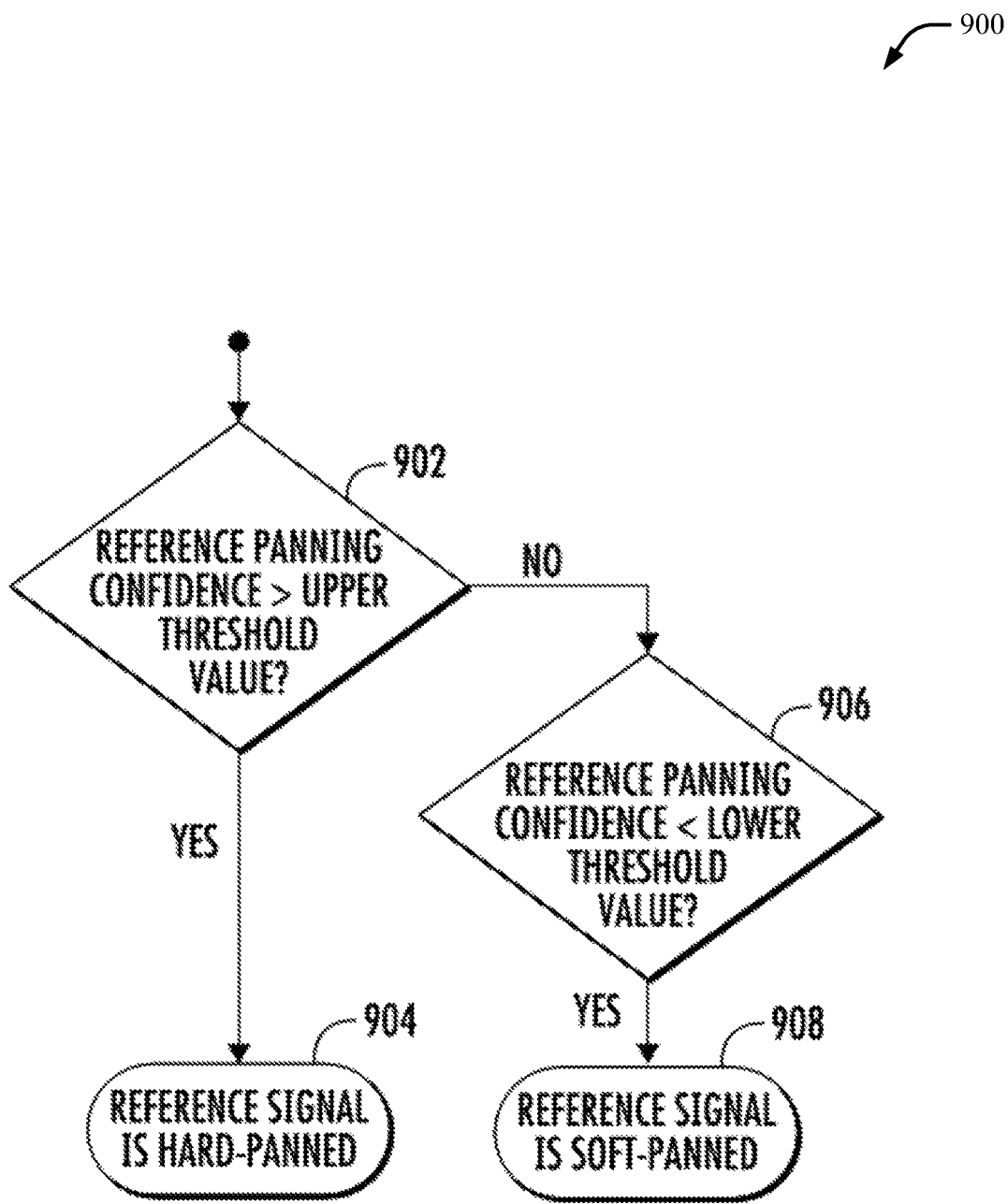
Figure 10:
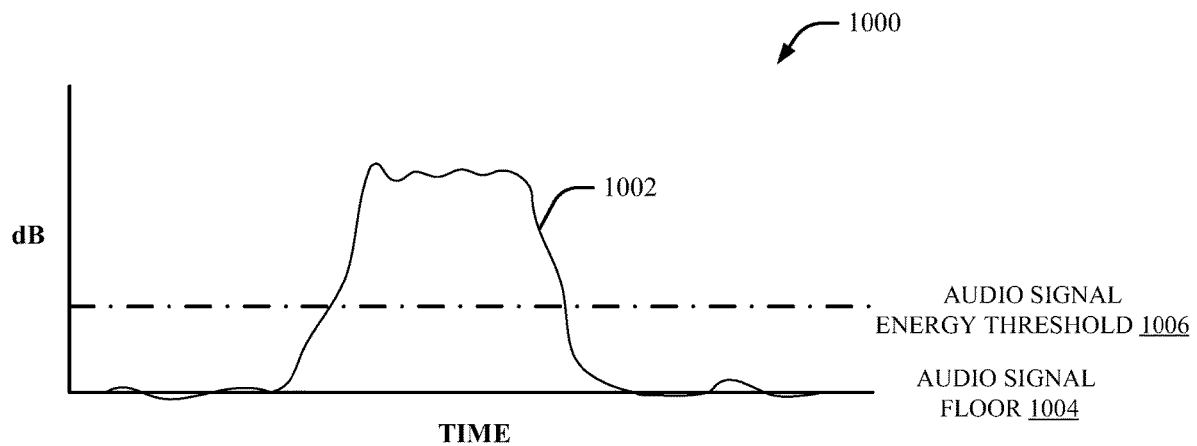
Figure 11:
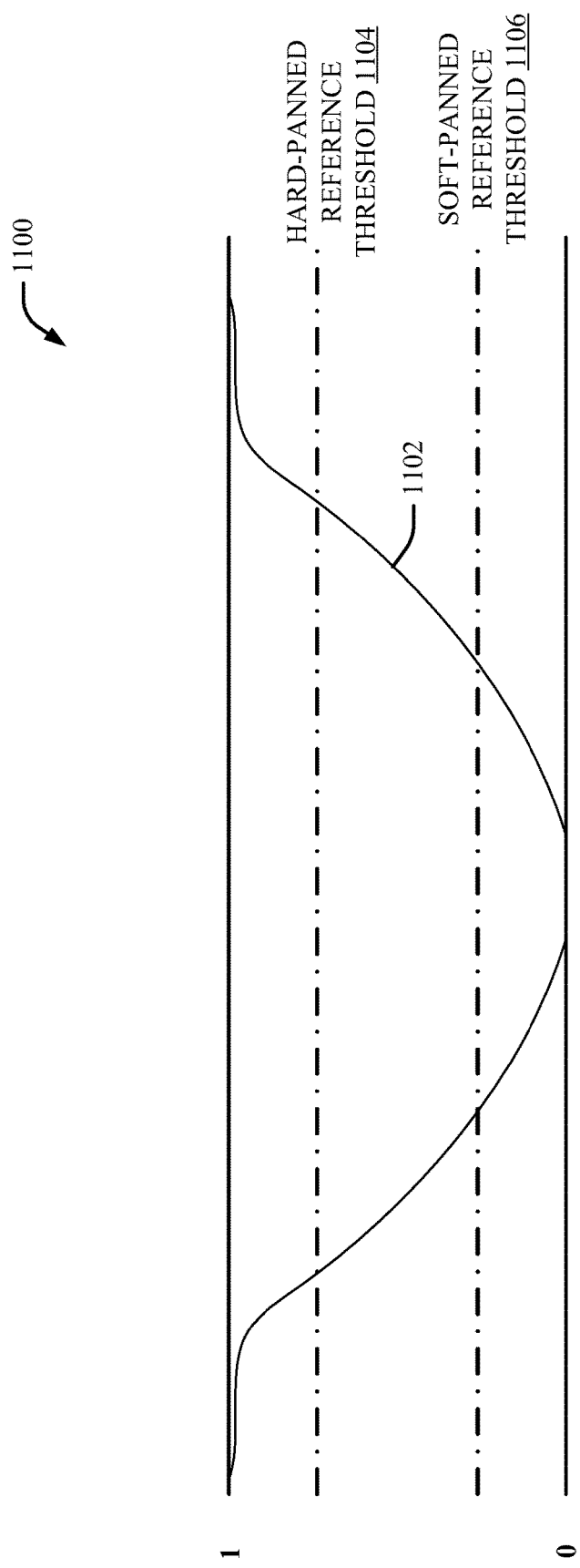
Figure 12:
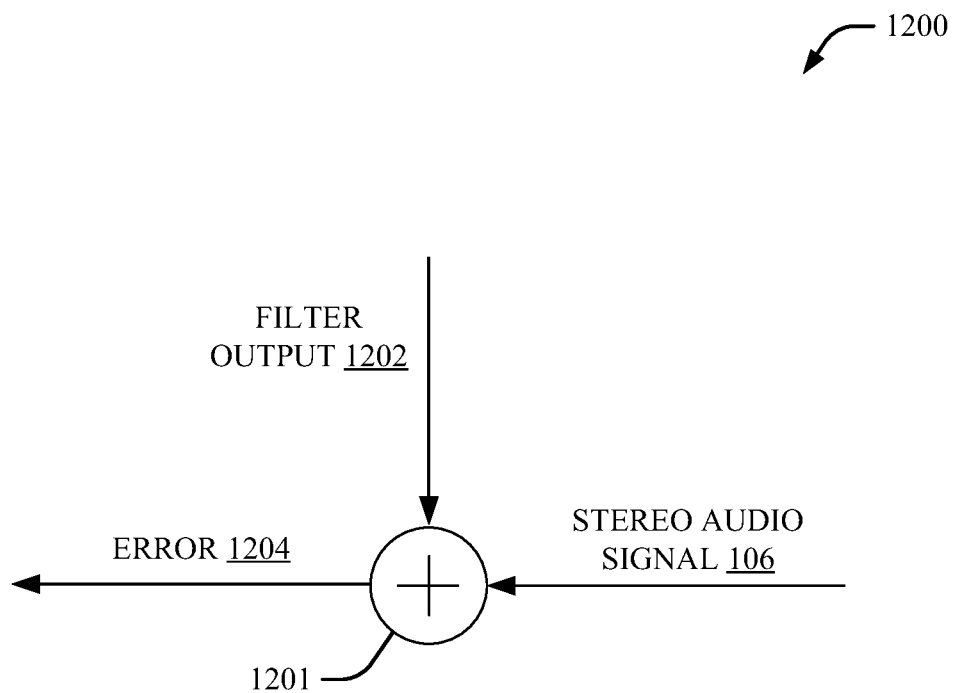
Figure 13:
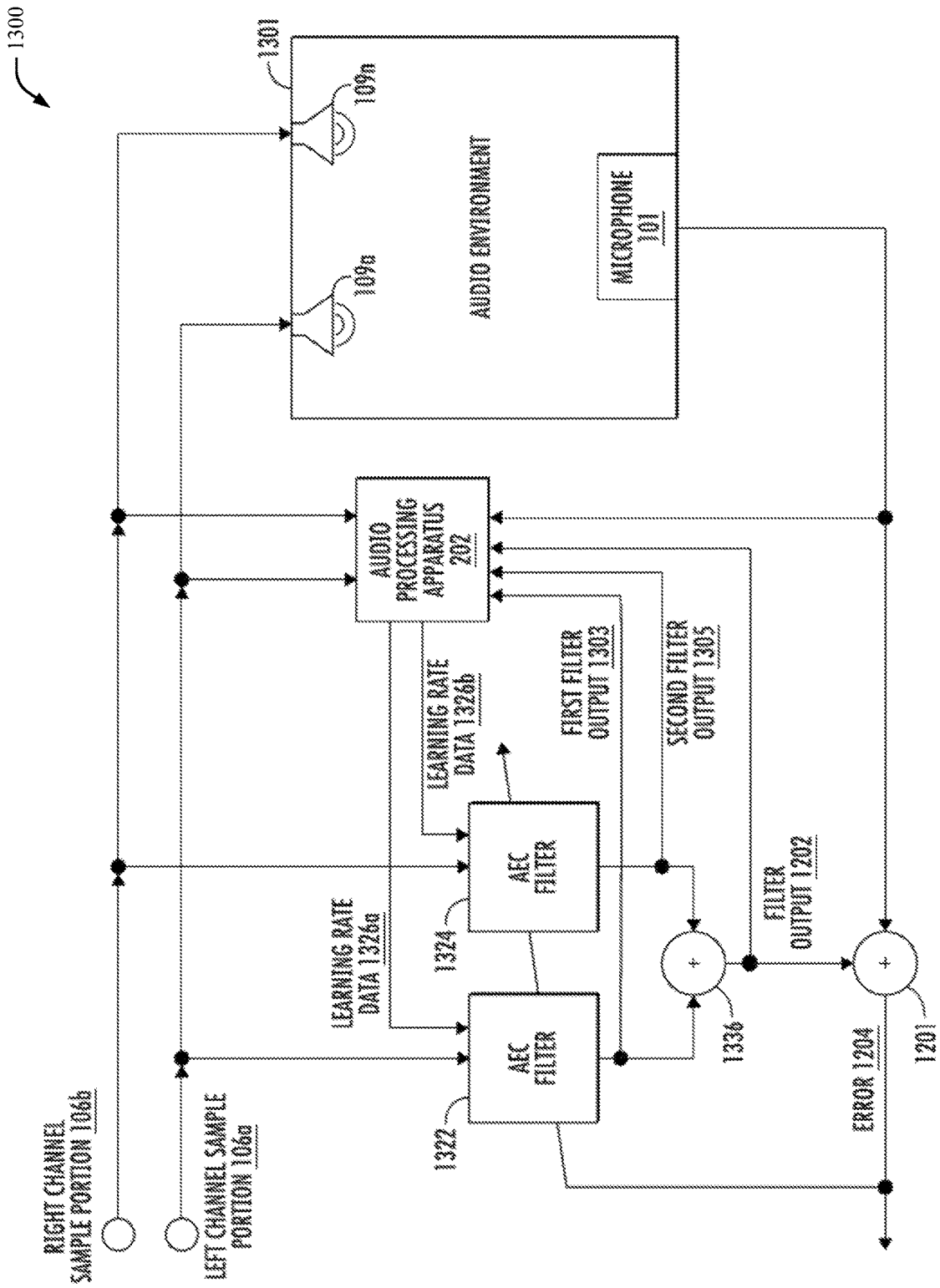
Figure 14:
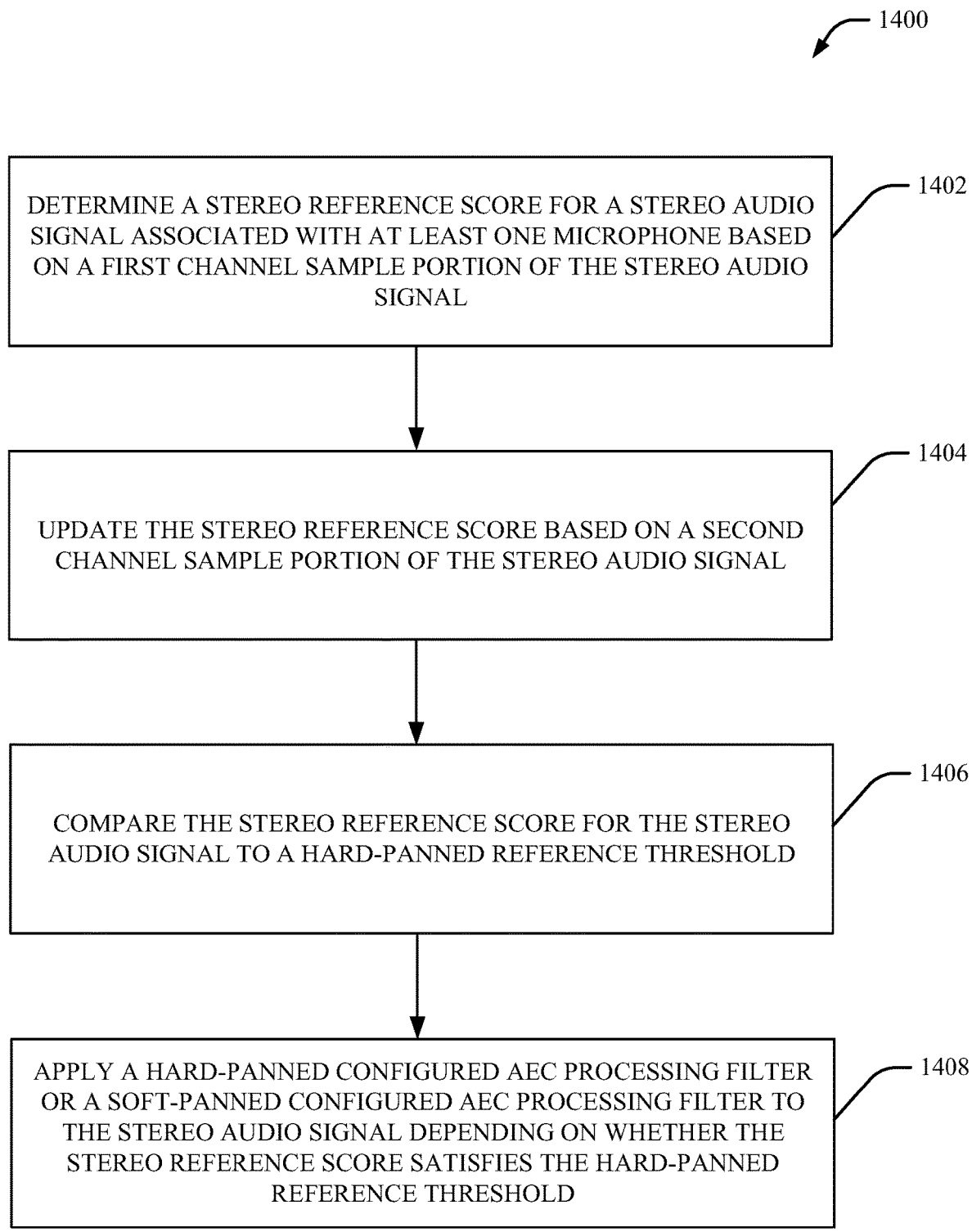
Figure 15:
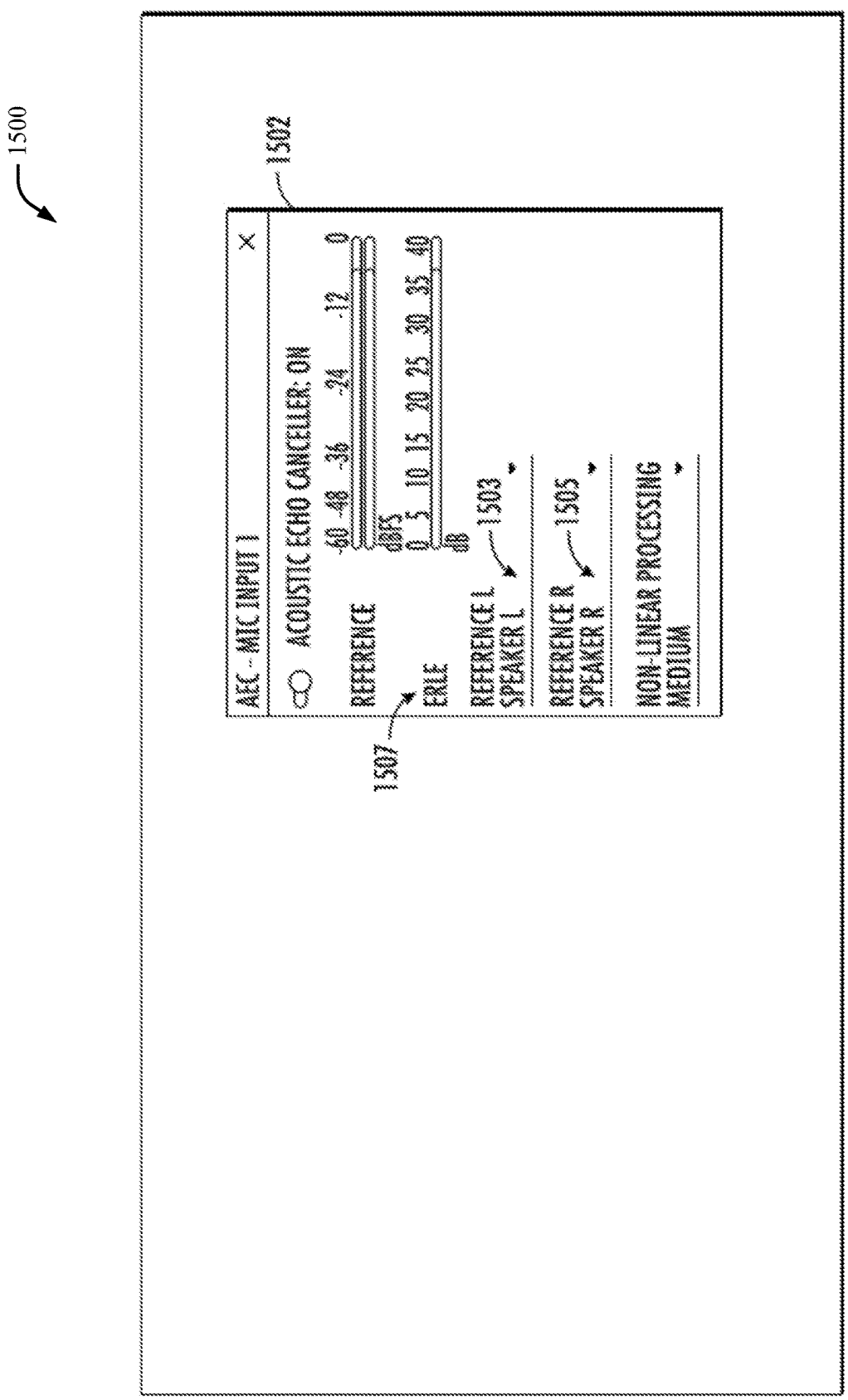
Figure 16:
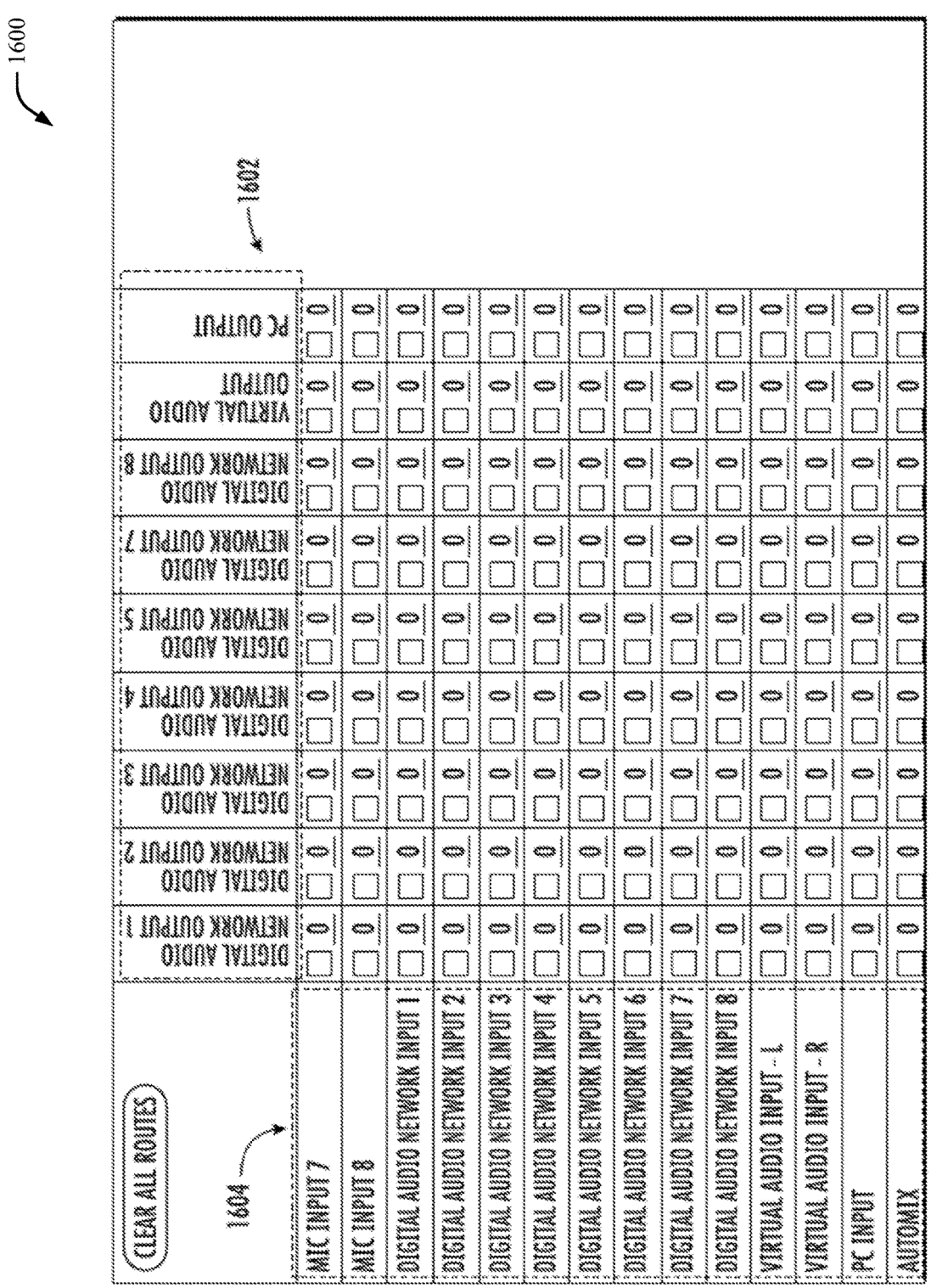
Figure 17:
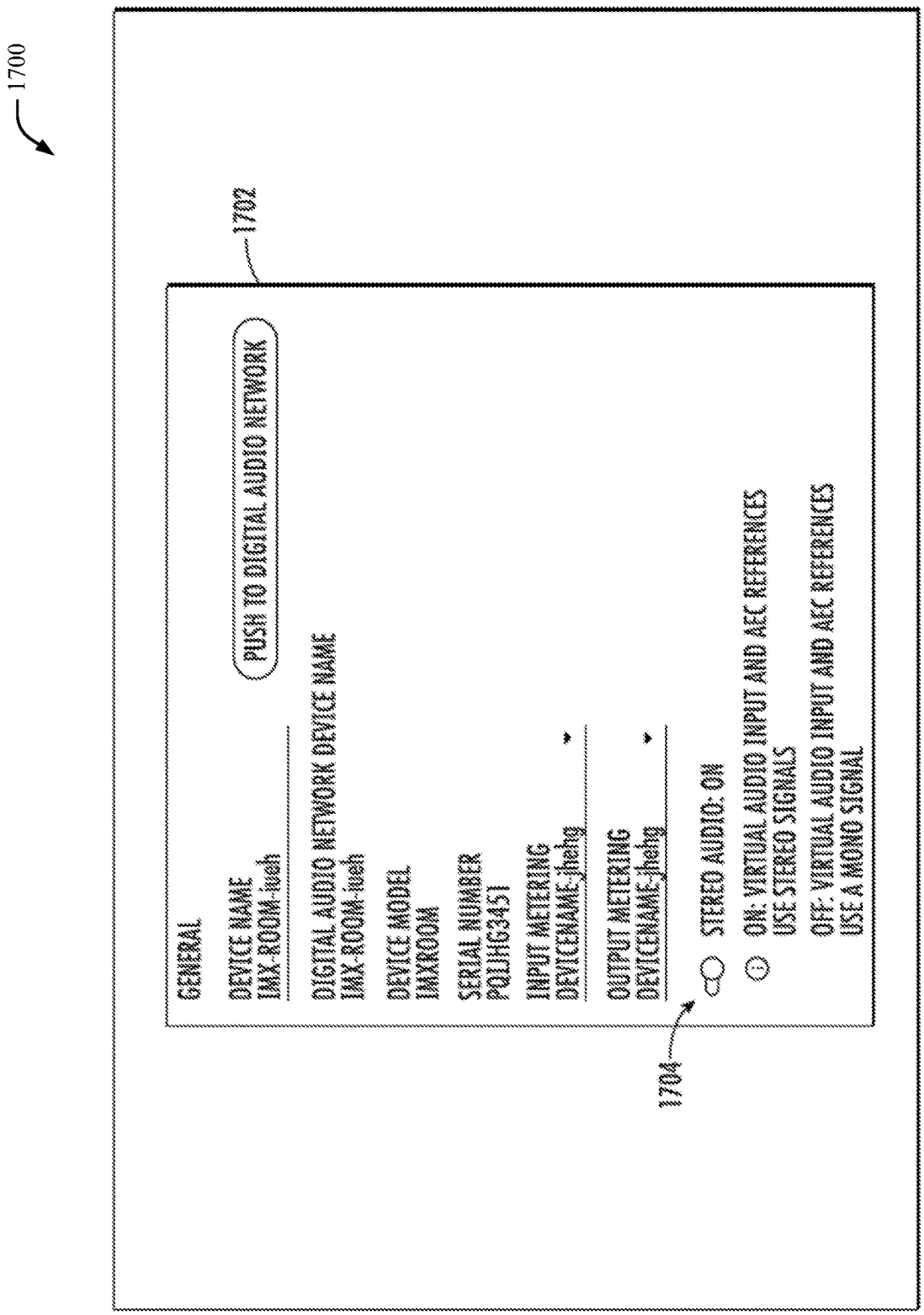
Figure 18:
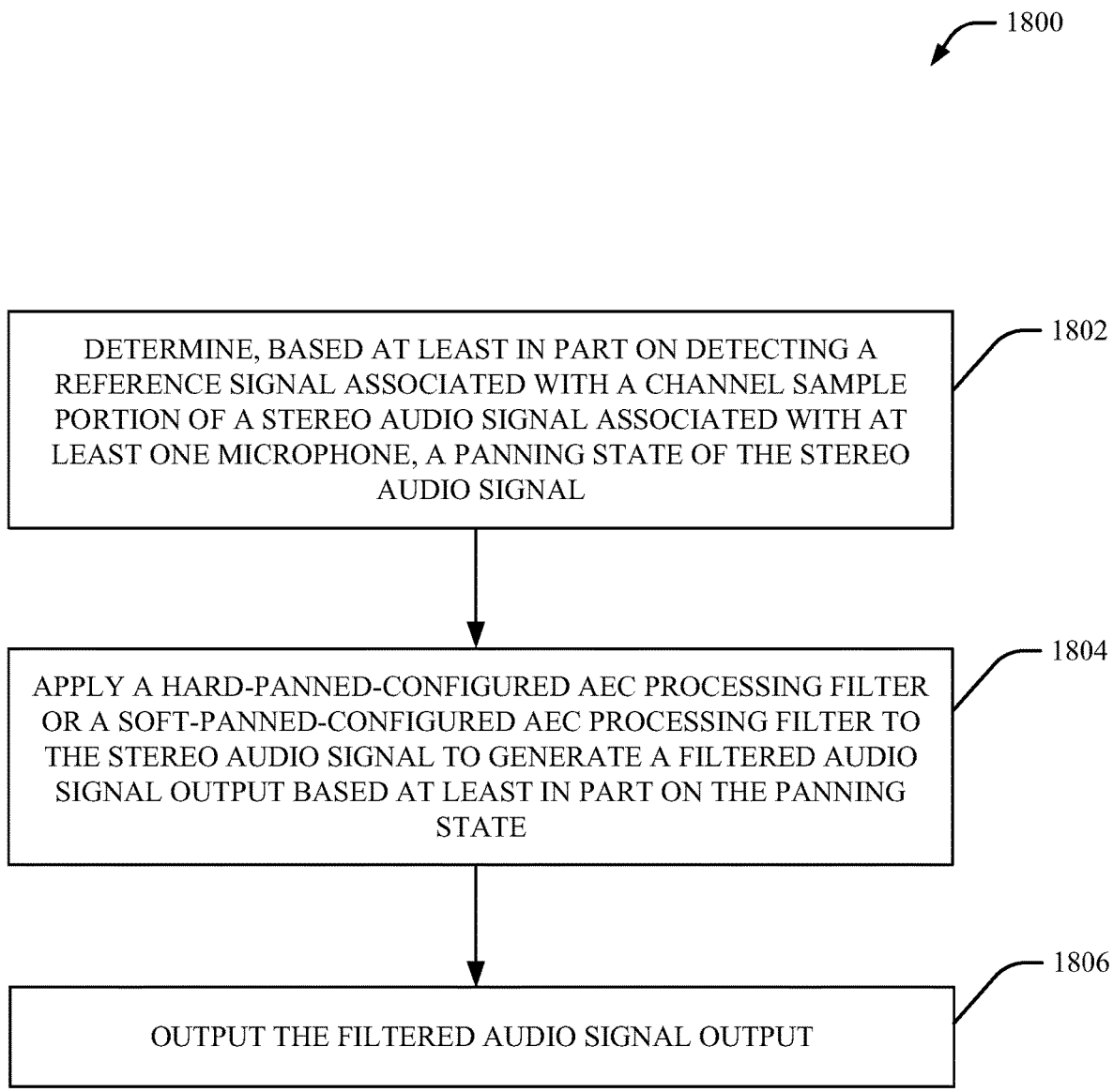

Having thus described some embodiments in general terms, reference will now be made to the accompanying drawings, which are not necessarily drawn to scale, and wherein:

FIG. 1 illustrates an example of an audio processing system that comprises an audio processing pipeline with a stereo acoustic echo cancellation (AEC) unit configured in accordance with one or more embodiments disclosed herein;

FIG. 2 illustrates an exemplary audio processing apparatus configured in accordance with one or more embodiments disclosed herein;

FIG. 3 illustrates an example of stereo acoustic echo cancellation unit configured with stereo reference scoring and AEC adaptive filtering in accordance with one or more embodiments disclosed herein;

FIG. 4 illustrates an example of a hard-panned-configured AEC processing filter in accordance with one or more embodiments disclosed herein;

FIG. 5 illustrates an example of a soft-panned-configured AEC processing filter in accordance with one or more embodiments disclosed herein;

FIG. 6 illustrates an example process for determining a reference state and/or a convergence state for a stereo audio signal in accordance with one or more embodiments disclosed herein;

FIG. 7 illustrates an example process for determining a near-end-audio state based on a reference state for a stereo audio signal in accordance with one or more embodiments disclosed herein;

FIG. 8 illustrates an example process for determining if a stereo audio signal is hard-panned or soft-panned in accordance with one or more embodiments disclosed herein;

FIG. 9 illustrates another example process for determining if a reference signal for a stereo audio signal is hard-panned or soft-panned in accordance with one or more embodiments disclosed herein;

FIG. 10 illustrates a graph associated with energy detection in accordance with one or more embodiments disclosed herein;

FIG. 11 illustrates a graph associated with stereo reference scoring in accordance with one or more embodiments disclosed herein;

FIG. 12 illustrates a system for determining a convergence state associated with a stereo audio signal in accordance with one or more embodiments disclosed herein;

FIG. 13 illustrates a system for providing adaptive acoustic echo cancellation for a stereo audio signal in accordance with one or more embodiments disclosed herein;

FIG. 14 illustrates an example method for adaptive stereo AEC processing in accordance with one or more embodiments disclosed herein;

FIG. 15 illustrates an exemplary audio processing control user interface in accordance with one or more embodiments disclosed herein;

FIG. 16 illustrates an exemplary audio processing control user interface in accordance with one or more embodiments disclosed herein;

FIG. 17 illustrates an exemplary audio processing control user interface in accordance with one or more embodiments disclosed herein; and FIG. 18 illustrates another example method for adaptive stereo AEC processing in accordance with one or more embodiments disclosed herein.

DETAILED DESCRIPTION

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements.

Overview

Through applied effort, ingenuity, and innovation, Applicant has identified solutions for improving acoustic echo cancellation (AEC) filtering for stereo audio signals as discussed in detail herein. In this regard, various embodiments of the present disclosure address technical problems associated with accurately, efficiently and/or reliably suppressing acoustic feedback (e.g., echo) from stereo audio signals. The disclosed techniques may be implemented by an audio processing system to provide improved AEC for a stereo audio signal. In accordance with various examples described herein, an audio processing system is configured to provide adaptive AEC for a stereo audio signal based on a reference panning state of the stereo audio signal.

For stereo AEC, a reference signal is a stereo audio source that comprises a left audio channel and a right audio channel. In an audio processing scenario where a left audio channel and a right audio channel are independent audio signals (e.g., hard-panned), it may be desirable for an audio processing system to perform different AEC processing operations on the independent audio signals than would be performed in a different audio processing scenario where the left audio channel and the right audio channel are correlated (e.g., soft-panned). A left audio channel and a right audio channel may be correlated due to, for example, cross-talk between the left audio channel and the right audio channel. As such, in accordance with various examples described herein, specially configured audio processing systems are designed to determine a panning state of a reference signal for stereo AEC. This panning state is then used to determine appropriate stereo AEC processing operations to perform on audio signals received from the stereo source.

In some examples, adaptive switching between a hard-panned mode and a soft-panned mode for stereo AEC processing operations may be utilized by example audio processing systems to suppress and/or cancel acoustic feedback from a stereo audio signal. If a reference signal is determined to be hard-panned, stereo AEC processing may be configured to perform acoustic feedback suppression using two mono AEC filters. In another example, if a reference signal is determined to be soft-panned, stereo AEC processing may be configured to combine two stereo AEC filters to form a combined signal for acoustic feedback suppression. Accordingly, acoustic feedback from a stereo audio signal may be suppressed and/or cancelled with improved accuracy, efficiency and/or reliability.

Exemplary Audio Processing Systems, Methods and User Interfaces for Adaptive Acoustic Echo Cancellation FIG. 1 illustrates an audio processing system 100 that is configured to provide adaptive stereo AEC filtering for a stereo audio signal according to one or more embodiments of the present disclosure. The depicted audio processing system 100 comprises an audio processing pipeline 102. The audio processing pipeline 102 comprises a stereo AEC unit 104. According to various embodiments, the audio processing system 100 may be configured to suppress and/or cancel acoustic feedback (e.g., echo) from a stereo audio signal 106. The stereo audio signal 106 may be associated with at least one microphone. For example, the stereo audio signal 106 may be generated and/or captured by one or more microphones 101*a-n*. In one example, the stereo audio signal 106 may be generated based on a single microphone 101*a*. In another example, the stereo audio signal 106 may be generated based on audio inputs received by multiple microphones 101*a-n* (e.g., at least a first microphone 101*a* and a second microphone 101*b*).

The stereo audio signal 106 may comprise audio (e.g., speech, music, etc.) captured via at least one microphone (e.g., via the one or more microphones 101*a-n*). Additionally, the stereo audio signal 106 may comprise acoustic feedback captured via the at least one microphone (e.g., via the one or more microphones 101*a-n*). The acoustic feedback may be introduced, for example, as a result of audio output provided by at least one speaker (e.g., one or more speakers 109*a-n*) positioned in audible proximity to the at least one microphone.

In various examples, the audio processing pipeline 102 is configured to suppress the acoustic feedback for a variety of listening products or output devices such as, for example, speakers, array speakers, sound bars, headphones, earphones, in ear monitors, and other listening devices, etc. The audio processing pipeline 102 may be implemented as an audio processing apparatus, a digital signal processing (DSP) apparatus, and/or as software that is configured for execution on a computer (e.g., a laptop or a personal computer), a smartphone, a digital audio workstation, a microphone, or other device. In certain examples, the audio processing pipeline 102 may additionally or alternatively be implemented via a web or cloud-based application perhaps as part of a video conferencing application. In certain examples, the audio processing pipeline 102 may be implemented via a virtual audio driver.

According to another example, the audio processing pipeline 102 may be incorporated into software that is configured for automatically suppressing acoustic feedback from one or more speakers in a conferencing system (e.g., an audio conferencing system, a video conferencing system, etc.). In one example, the audio processing pipeline 102 may be integrated within an outbound audio chain from local participants in a conferencing system. In one example, the audio processing pipeline 102 may be integrated within an inbound audio chain from remote participants in a conferencing system.

The stereo audio signal 106 may be associated with at least a first channel sample portion and a second channel sample portion. For example, the first channel sample portion may correspond to a left audio channel of the stereo audio signal 106 and the second channel sample portion may correspond to a right audio channel of the stereo audio signal 106. In another example, the first channel sample portion may correspond to a right audio channel of the stereo audio signal 106 and the second channel sample portion may correspond to a left audio channel of the stereo audio signal 106.

To adaptively apply AEC processing operations to the stereo audio signal 106, the depicted stereo AEC unit 104 may be configured to determine a stereo reference score for the stereo audio signal 106 based on the first channel sample portion of the stereo audio signal 106. The first channel sample portion could be either of a right audio channel or a left audio channel of the stereo audio signal 106.

The depicted stereo AEC unit 104 may be further configured to update the stereo reference score based on the second channel sample portion of the stereo audio signal 106. Thus, if the stereo AEC unit 104 determines the stereo reference score based on the left audio channel in a first instance, the stereo AEC unit 104 may determine an updated stereo reference score based on the right audio channel in a second instance.

The stereo reference score may be a value that corresponds to a degree of panning between the first channel sample portion and the second channel sample portion. For example, a higher value for the stereo reference score may correspond to a higher likelihood of hard-panning between the first channel sample portion and the second channel sample portion. Furthermore, a lower value for the stereo reference score may correspond to a higher likelihood of soft-panning between the first channel sample portion and the second channel sample portion.

The stereo AEC unit 104 may be configured to use the stereo reference score and any updated stereo reference score to determine if the first channel sample portion and the second channel sample portion of the stereo audio signal 106 are independent audio signals (e.g., hard-panned) or correlated audio signals (e.g., soft-panned). For example, the stereo AEC unit 104 may be configured to compare the stereo reference score for the stereo audio signal to a hard-panned reference threshold and a soft-panned reference threshold.

The hard-panned reference threshold may be a predefined stereo reference score value that corresponds to hard-panning between the first channel sample portion and the second channel sample portion. The soft-panned reference threshold may be a predefined stereo reference score value that corresponds to soft-panning between the first channel sample portion and the second channel sample portion. The soft-panned reference threshold may be different than the hard-panned reference threshold such that, in certain examples, the stereo reference score does not satisfy either the hard-panned reference threshold or the soft-panned reference threshold. The hard-panned reference threshold and the soft-panned reference threshold may be predetermined based on a predicted confidence for hard-panning and soft-panning. Alternatively, the hard-panned reference threshold and the soft-panned reference threshold may be dynamically determined and/or configured based on a type of audio environment, a type of microphone, and/or a type of speaker associated with the stereo audio signal 106.

In a response to a first determination that the stereo reference score satisfies the hard-panned reference threshold, the stereo AEC unit 104 may be configured to apply a hard-panned-configured AEC processing filter to the stereo audio signal 106 to generate a filtered audio signal output 108. And, in response to a second determination that the stereo reference score satisfies the soft-panned reference threshold, the stereo AEC unit 104 may be configured to apply a soft-panned-configured AEC processing filter to the stereo audio signal 106 to generate a filtered audio signal output 108. The hard-panned-configured AEC processing filter may be configured for mono-channel processing via one or more mono AEC filters. Additionally, the hard-panned-configured AEC processing filter may comprise one or more adaptive filters configured for AEC processing of hard-panned or soft-panned stereo audio signals, as some examples. The soft-panned-configured AEC processing filter may be configured for stereo-channel processing via two mono AEC filters.

In certain examples, a first energy detection score may be determined for the first channel sample portion. Furthermore, a second energy detection score may be determined for the second channel sample portion. The first energy detection score may be a value that corresponds to a degree of energy present in the first channel sample portion. For example, a higher value for the first energy detection score may correspond to a higher presence of energy in the first channel sample portion and a lower value for the first energy detection score may correspond to a lower presence of energy in the first channel sample portion.

The second energy detection score may be a value that corresponds to a degree of energy present in the second channel sample portion. For example, a higher value for the second energy detection score may correspond to a higher presence of energy in the second channel sample portion and a lower value for the second energy detection score may correspond to a lower presence of energy in the second channel sample portion.

The first energy detection score and the second energy detection score may be compared to an energy detection threshold. Furthermore, the stereo reference score for the stereo audio signal may be updated based on the first energy detection score or the second energy detection score satisfying the energy detection threshold.

The filtered audio signal output 108 provided by the hard-panned-configured AEC processing filter may be filtered differently than the filtered audio signal output 108 provided by the soft-panned-configured AEC processing filter. For example, the hard-panned-configured AEC processing filter applied to the stereo audio signal 106 may generate first filtered audio signal output that is different than second filtered audio signal output generated as a result of the soft-panned-configured AEC processing filter being applied to the stereo audio signal 106. In one or more examples, the filtered audio signal output 108 may be provided to the one or more speakers 109a-n.

FIG. 2 illustrates the audio processing apparatus 202 configured in accordance with one or more embodiments of the present disclosure. The audio processing apparatus 202 may be configured to perform one or more techniques described in FIG. 1 and/or one or more other techniques described herein. The audio processing apparatus 202 may be embedded in an audio processing system. In some examples, one or more portions of the audio processing apparatus 202 may correspond to the stereo AEC unit 104. In some examples, the audio processing apparatus 202 may be embedded in a conferencing system. In some examples, the audio processing apparatus 202 may be embedded in a microphone.

In some cases, the audio processing apparatus 202 may be a firmware computing system communicatively coupled with, and configured to control, one or more circuit modules associated with audio processing audio processing. For example, the audio processing apparatus 202 may be a firmware computing system and/or a computing system communicatively coupled with one or more circuit modules related to audio processing. The audio processing apparatus 202 may comprise or otherwise be in communication with a processor 204, a memory 206, stereo AEC circuitry 208, audio processing circuitry 210, input/output circuitry 212, and/or communications circuitry 214. In some examples, the processor 204 (which may comprise multiple or co-processors or any other processing circuitry associated with the processor) may be in communication with the memory 206.

The memory 206 may comprise non-transitory memory circuitry and may comprise one or more volatile and/or non-volatile memories. In some examples, the memory 206 may be an electronic storage device (e.g., a computer readable storage medium) configured to store data that may be retrievable by the processor 204. In some examples, the data stored in the memory 206 may comprise stereo audio signal data, channel sample portion data, stereo reference score data, or the like, for enabling the apparatus to carry out various functions or methods in accordance with embodiments of the present invention, described herein.

In some examples, the processor 204 may be embodied in a number of different ways. For example, the processor may be embodied as one or more of various hardware processing means such as a central processing unit (CPU), a microprocessor, a coprocessor, a digital signal processor (DSP), an Advanced RISC Machine (ARM), a field programmable gate array (FPGA), a neural processing unit (NPU), a graphics processing unit (GPU), a system on chip (SoC), a cloud server processing element, a controller, or a processing element with or without an accompanying DSP. The processor 204 may also be embodied in various other processing circuitry including integrated circuits such as, for example, a microcontroller unit (MCU), an ASIC (application specific integrated circuit), a hardware accelerator, a cloud computing chip, or a special-purpose electronic chip. Furthermore, in some examples, the processor may comprise one or more processing cores configured to perform independently. A multi-core processor may enable multiprocessing within a single physical package. Additionally or alternatively, the processor may comprise one or more processors configured in tandem via the bus to enable independent execution of instructions, pipelining, and/or multithreading.

In an example, the processor 204 may be configured to execute instructions, such as computer program code or instructions, stored in the memory 206 or otherwise accessible to the processor 204. Alternatively or additionally, the processor 204 may be configured to execute hard-coded functionality. As such, whether configured by hardware or software instructions, or by a combination thereof, the processor 204 may represent a computing entity (e.g., physically embodied in circuitry) configured to perform operations according to an embodiment of the present invention described herein. For example, when the processor 204 is embodied as an CPU, DSP, ARM, FPGA, ASIC, or similar, the processor may be configured as hardware for conducting the operations of an embodiment of the invention. Alternatively, when the processor 204 is embodied to execute software or computer program instructions, the instructions may specifically configure the processor 204 to perform the algorithms and/or operations described herein when the instructions are executed. However, in some cases, the processor 204 may be a processor of a device (e.g., a mobile terminal, a fixed computing device, an edge device, etc.) specifically configured to employ an embodiment of the present invention by further configuration of the processor using instructions for performing the algorithms and/or operations described herein. The processor 204 may further comprise a clock, an arithmetic logic unit (ALU) and logic gates configured to support operation of the processor 204, among other things.

In one or more examples, the audio processing apparatus 202 may comprise the stereo AEC circuitry 208. The stereo AEC circuitry 208 may be any means embodied in either hardware or a combination of hardware and software that is configured to perform one or more functions disclosed herein related to the stereo AEC unit 104. In one or more examples, the audio processing apparatus 202 may comprise the audio processing circuitry 210. The audio processing circuitry 210 may be any means embodied in either hardware or a combination of hardware and software that is configured to perform one or more functions disclosed herein related to the stereo AEC unit 104.

In certain examples, the audio processing apparatus 202 may comprise the input/output circuitry 212 that may, in turn, be in communication with processor 204 to provide output to the user and, in some examples, to receive an indication of a user input. The input/output circuitry 212 may comprise a user interface and may comprise a display, and may comprise an electronic interface, a web user interface, a mobile application, a query-initiating computing device, a kiosk, or the like. In some examples, the input/output circuitry 212 may also comprise a keyboard, a mouse, a joystick, a touch screen, touch areas, soft keys, a microphone, a speaker, or other input/output mechanisms. In some examples, the processor 204 may be configured to control one or more functions of one or more user interface elements through computer program instructions (e.g., software and/or firmware) stored on memory (e.g., memory 206, and/or the like) accessible to the processor 204.

In certain examples, the audio processing apparatus 202 may comprise the communications circuitry 214. The communications circuitry 214 may be any means embodied in either hardware or a combination of hardware and software that is configured to receive and/or transmit data from/to a network and/or any other device or module in communication with the audio processing apparatus 202. In this regard, the communications circuitry 214 may comprise, for example, a network interface for enabling communications with a wired or wireless communication network. For example, the communications circuitry 214 may comprise one or more network interface cards, antennae, buses, switches, routers, modems, and supporting hardware and/or software, or any other device suitable for enabling communications via a network. Additionally or alternatively, the communications circuitry 214 may comprise the circuitry for interacting with the antenna/antennae to cause transmission of signals via the antenna/antennae or to handle receipt of signals received via the antenna/antennae.

FIG. 3 illustrates an audio processing system 300 that provides adaptive stereo AEC filtering for a stereo audio signal according to one or more embodiments of the present disclosure. The audio processing system 300 comprises the audio processing pipeline 102. The audio processing pipeline 102 comprises the stereo AEC unit 104. In accordance with one or more examples described herein, the stereo AEC unit 104 comprises stereo reference scoring logic 302 and AEC adaptive filtering logic 304. In an example where one or more portions of the stereo AEC unit 104 may correspond to one or more portions of the audio processing apparatus 202, the stereo reference scoring logic 302 and AEC adaptive filtering logic 304 may be logic executed by the stereo AEC circuitry 208 of the audio processing apparatus 202.

The AEC adaptive filtering logic 304 comprises a hard-panned-configured AEC processing filter 306 and a soft-panned-configured AEC processing filter 308. The stereo reference scoring logic 302 receives a left channel sample portion 106a and a right channel sample portion 106b. The left channel sample portion 106a corresponds to a left audio channel of the stereo audio signal 106 and the right channel sample portion 106b corresponds to a right audio channel of the stereo audio signal 106. For example, in an example, the left channel sample portion 106a is the first channel sample portion of the stereo audio signal 106 and the right channel sample portion 106b is the second channel sample portion of the stereo audio signal 106. In another example, the right channel sample portion 106b is the first channel sample portion of the stereo audio signal 106 and the left channel sample portion 106a is the second channel sample portion of the stereo audio signal 106.

In an example, the stereo reference scoring logic 302 may determine a stereo reference score for the stereo audio signal 106 based on the left channel sample portion 106a. Further, the stereo reference scoring logic 302 may update the stereo reference score based on the right channel sample portion 106b. In some examples, the stereo reference scoring logic 302 may determine a stereo reference score for the stereo audio signal 106 based on right channel sample portion 106b. Additionally or alternatively, the stereo reference scoring logic 302 may update the stereo reference score based on the left channel sample portion 106a.

The stereo reference score may be utilized to select between the hard-panned-configured AEC processing filter 306 and the soft-panned-configured AEC processing filter 308. For instance, the stereo reference scoring logic 302 may compare the stereo reference score (e.g., the stereo reference score determined based on the left channel sample portion 106a and the right channel sample portion 106b) to the hard-panned reference threshold. Depending on whether the stereo reference score satisfies the hard-panned reference threshold or the soft-panned reference threshold, the stereo AEC unit 104 may apply the hard-panned-configured AEC processing filter 306 or the soft-panned-configured AEC processing filter 308 to the left channel sample portion 106a and/or the right channel sample portion 106b of the stereo audio signal 106. For example, in a circumstance in which the stereo reference score satisfies the hard-panned reference threshold and the left channel sample portion 106a is determined to comprise audio data, the stereo AEC unit 104 may apply the hard-panned-configured AEC processing filter 306 to the left channel sample portion 106a to generate the filtered audio signal output 108.

In another example in which the stereo reference score satisfies the hard-panned reference threshold and the right channel sample portion 106b is determined to comprise audio data, the stereo AEC unit 104 may apply the hard-panned-configured AEC processing filter 306 to the right channel sample portion 106b to generate the filtered audio signal output 108.

Alternatively, in an example in which the stereo reference score satisfies the soft-panned reference threshold, the stereo AEC unit 104 may apply the soft-panned-configured AEC processing filter 308 to the left channel sample portion 106a and the right channel sample portion 106b to generate the filtered audio signal output 108. As such, the stereo AEC unit 104 may be configured with adaptive switching between the hard-panned-configured AEC processing filter 306 and the soft-panned-configured AEC processing filter 308 to provide the filtered audio signal output 108.

The hard-panned-configured AEC processing filter 306 may comprise one or more filters configured for a hard-panned mode for AEC processing with respect to stereo audio signals. For instance, the hard-panned-configured AEC processing filter 306 may select an adaptive filter to process the left channel sample portion 106a or the right channel sample portion 106b. In an example, the adaptive filter of the hard-panned-configured AEC processing filter 306 may be a least mean square (LMS) filter that utilizes a set of filter coefficients to generate a least mean square version of the left channel sample portion 106a and/or the right channel sample portion 106b. In certain examples, the adaptive filter of the hard-panned-configured AEC processing filter 306 may be a Wiener filter that applies linear time-invariant filtering with respect to the left channel sample portion 106a and/or the right channel sample portion 106b.

The soft-panned-configured AEC processing filter 308 may comprise one or more filters configured for a soft-panned mode for AEC processing with respect to stereo audio signals. For instance, the soft-panned-configured AEC processing filter 308 may comprise a first adaptive filter configured to process the left channel sample portion 106a and a second adaptive filter configured to process the right channel sample portion 106b. In an example, the first adaptive filter and the second adaptive filter of the soft-panned-configured AEC processing filter 308 may be LMS filters. In certain examples, the first adaptive filter and the second adaptive filter of the soft-panned-configured AEC processing filter 308 may be Wiener filters associated with linear time-invariant filtering.

The one or more filters for the hard-panned-configured AEC processing filter 306 may be configured differently than the one or more filters for the soft-panned-configured AEC processing filter 308. For example, the hard-panned-configured AEC processing filter 306 may be configured as a filtering system that comprises two mono AEC filters. In contrast, the soft-panned-configured AEC processing filter 308 may be configured as a filtering system that comprises two stereo AEC filters. However, it is to be appreciated that, in certain examples, the hard-panned-configured AEC processing filter 306 may be configured differently to provide a hard-panned mode for AEC processing and/or the soft-panned-configured AEC processing filter 308 may be configured differently to provide a soft-panned mode for AEC processing.

In certain examples in which the stereo reference score satisfies the hard-panned reference threshold, the stereo reference scoring logic 302 may determine a panning confidence value for the stereo reference score. The stereo reference scoring logic 302 may also compare the panning confidence value to a threshold confidence value associated with the hard-panned-configured AEC processing filter 306.

In response to a determination that the panning confidence value is above the threshold confidence value, the stereo AEC unit 104 may apply the hard-panned-configured AEC processing filter 306 to the left channel sample portion 106a or the right channel sample portion 106b of the stereo audio signal 106 to generate the filtered audio signal output 108. Additionally, in response to a determination that the panning confidence value is below the threshold confidence value, the stereo AEC unit 104 may apply the soft-panned-configured AEC processing filter 308 to the left channel sample portion 106a and the right channel sample portion 106b of the stereo audio signal 106 to generate the filtered audio signal output 108.

In certain examples, the stereo AEC unit 104 may determine a stereo reference state for the stereo audio signal based on the left channel sample portion 106a and the right channel sample portion 106b. If the stereo reference state is determined to correspond to the left channel sample portion 106a, the stereo AEC unit 104 may adapt residual echo suppression for the hard-panned-configured AEC processing filter 306 based on the left channel sample portion 106a to generate the filtered audio signal output 108.

Alternatively, if the stereo reference state corresponds to the right channel sample portion 106b, the stereo AEC unit 104 may adapt residual echo suppression for the hard-panned-configured AEC processing filter 306 based on the right channel sample portion 106b to generate the filtered audio signal output 108. In certain examples in which the stereo reference score satisfies the hard-panned reference threshold, the stereo AEC unit 104 may alter a training rate for one or more filters for the hard-panned-configured AEC processing filter 306. The training rate may correspond to a degree of tuning for one or more taps of a filter, for example.

FIG. 4 illustrates the hard-panned-configured AEC processing filter 306 according to one or more embodiments of the present disclosure. The hard-panned-configured AEC processing filter 306 comprises a mono AEC filter 402 and a mono AEC filter 404. The mono AEC filter 402 may be a first adaptive filter configured for mono-channel processing and the mono AEC filter 404 may be a second adaptive filter configured for mono-channel processing. For example, the mono AEC filter 402 may be a first LMS filter and the mono AEC filter 404 may be a second LMS filter. In certain examples, the mono AEC filter 402 may be a first Wiener filter and the mono AEC filter 404 may be a second Wiener filter. In an example where the stereo reference score satisfies the hard-panned reference threshold, a selected channel sample portion 406 may be provided to either the mono AEC filter 402 or the mono AEC filter 404 for AEC processing associated with a hard-panned mode.

The selected channel sample portion 406 may correspond to either the left channel sample portion 106a or the right channel sample portion 106b. For example, in an example in which the stereo reference state for the stereo audio signal 106 corresponds to the left channel sample portion 106a, the selected channel sample portion 406 may correspond to the left channel sample portion 106a and the selected channel sample portion 406 may be provided to the mono AEC filter 402. Additionally, in the example in which the stereo reference state for the stereo audio signal 106 corresponds to the left channel sample portion 106a, a filtered version of the selected channel sample portion 406 provided by the mono AEC filter 402 may correspond to the filtered audio signal output 108. For example, a filtered version of the selected channel sample portion 406 may be provided by the mono AEC filter 402 and the mono AEC filter 404 may provide output equal to zero or approximately zero. To provide the filtered audio signal output 108, a filter combiner element 401 may be utilized to combine output respectively provided by the mono AEC filter 402 and the mono AEC filter 404.

In an example in which the stereo reference state for the stereo audio signal 106 corresponds to the right channel sample portion 106b, the selected channel sample portion 406 may correspond to the right channel sample portion 106b and the selected channel sample portion 406 may be provided to the mono AEC filter 404. Additionally, in the example in which the stereo reference state for the stereo audio signal 106 corresponds to the right channel sample portion 106b, a filtered version of the selected channel sample portion 406 provided by the mono AEC filter 404 may correspond to the filtered audio signal output 108. For example, a filtered version of the selected channel sample portion 406 may be provided by the mono AEC filter 404 and the mono AEC filter 402 may provide output equal to zero or approximately zero.

FIG. 5 illustrates the soft-panned-configured AEC processing filter 308 according to one or more examples of the present disclosure. The soft-panned-configured AEC processing filter 308 comprises a stereo AEC filter 502 and a stereo AEC filter 504. The stereo AEC filter 502 may be a first adaptive filter configured for stereo-channel processing and the stereo AEC filter 504 may be a second adaptive filter configured for stereo-channel processing. For example, the stereo AEC filter 502 may be a first LMS filter that utilizes a first set of filter coefficients to generate a least mean square version of the left channel sample portion 106a and the stereo AEC filter 504 may be a second LMS filter that utilizes a second set of filter coefficients to generate a least mean square version of the right channel sample portion 106b. The first set of filter coefficients may be different than the second set of filter coefficients. Alternatively, the first set of filter coefficients may correspond to the second set of filter coefficients. In certain examples, the stereo AEC filter 502 may be a first Wiener filter and the stereo AEC filter 504 may be a second Wiener filter.

In an example where the stereo reference score satisfies the soft-panned reference threshold, the left channel sample portion 106a may be provided to the stereo AEC filter 502 and the right channel sample portion 106b may be provided to the stereo AEC filter 504 for AEC processing associated with a soft-panned mode. Accordingly, in contrast to the mono AEC filter 402 and the mono AEC filter 404 configured for mono-channel processing of the selected channel sample portion 406, the stereo AEC filter 502 may be configured for stereo-channel processing of the left channel sample portion 106a and the stereo AEC filter 504 may be configured for stereo-channel processing of the right channel sample portion 106b. One or more portions of a filtering configuration may be shared between the stereo AEC filter 502 and the stereo AEC filter 504. For example, one or more filter coefficients, one or more filter values for a data matrix, one or more portions of learning rate data, and/or one or more other filtering configurations may be similarly configured between the stereo AEC filter 502 and the stereo AEC filter 504 to provide stereo-channel processing of the left channel sample portion 106a and the right channel sample portion 106b.

In one or more examples, output from the stereo AEC filter 502 and the stereo AEC filter 504 may be combined to provide the filtered audio signal output 108. To provide the filtered audio signal output 108, a filter combiner element 501 may be utilized to combine output respectively provided by the stereo AEC filter 502 and the stereo AEC filter 504.

In certain examples where a reference signal for the left channel sample portion 106a and the right channel sample portion 106b are simultaneously active and hard-panned, the stereo reference scoring logic 302 can determine that the stereo reference score satisfies the soft-panned reference threshold such that the left channel sample portion 106a may be provided to the stereo AEC filter 502 and the right channel sample portion 106b may be provided to the stereo AEC filter 504 for AEC processing associated with the soft-panned mode.

FIG. 6 illustrates a flowchart diagram of an example process 600 for determining a reference state and/or a convergence state for the stereo audio signal 106 according to one or more embodiments of the present disclosure. The process 600 may be performed by the stereo reference scoring logic 302 of the stereo AEC unit 104. At operation 602, the stereo reference scoring logic 302 may determine whether a reference signal is detected with respect to the stereo audio signal 106. If no reference signal is detected, the stereo reference scoring logic 302 may determine at operation 604 that a reference state for the stereo audio signal 106 corresponds to a "NO_REF_TALK" label. The "NO_REF_TALK" label may indicate that a reference signal is not detected for the stereo audio signal 106. However, if a reference signal is detected for the stereo audio signal 106, the stereo reference scoring logic 302 may determine at operation 606 whether a left reference signal is only detected with respect to the stereo audio signal 106.

If only the left reference signal is detected for the stereo audio signal 106, the stereo reference scoring logic 302 may determine at operation 608 that a reference state for the stereo audio signal 106 corresponds to a "LEFT_REF_TALK" label and a left convergence state for the stereo audio signal 106 is obtained at operation 610. The "LEFT_REF_TALK" label may indicate that a left audio channel of the stereo audio signal 106 is associated with audio. If a reference signal is detected for the stereo audio signal 106, the stereo reference scoring logic 302 may determine at operation 612 whether a right reference signal is only detected with respect to the stereo audio signal 106.

If only the right reference signal is detected for the stereo audio signal 106, the stereo reference scoring logic 302 may determine at operation 614 that a reference state for the stereo audio signal 106 corresponds to a "RIGHT_REF_TALK" label and a right convergence state for the stereo audio signal 106 is obtained at operation 616. The "RIGHT_REF_TALK" label may indicate that a right audio channel of the stereo audio signal 106 is associated with audio.

If a reference signal is detected for the stereo audio signal 106, the stereo reference scoring logic 302 may also determine at operation 618 whether both a left reference signal and a right reference signal are detected with respect to the stereo audio signal 106. If the left reference signal and the right reference signal are detected for the stereo audio signal 106, the stereo reference scoring logic 302 may determine at operation 620 that a reference state for the stereo audio signal 106 corresponds to a "DOUBLE_REF_TALK" label and a combined convergence state for the stereo audio signal 106 is obtained at operation 622. The "DOUBLE_REF_TALK" label may indicate that both the left audio channel and the right audio channel of the stereo audio signal 106 are associated with audio.

A reference state label (e.g., the LEFT_REF_TALK" label, the "RIGHT_REF_TALK" label, or the "DOUBLE_REF_TALK" label) for the stereo audio signal 106 may be utilized for stereo reference scoring and/or selecting between the hard-panned-configured AEC processing filter 306 and the soft-panned-configured AEC processing filter 308. In certain examples, a reference state label (e.g., the LEFT_REF_TALK" label, the "RIGHT_REF_TALK" label, or the "DOUBLE_REF_TALK" label) may be utilized to generate a simulated echo signal. In an example, the simulated echo signal may be an attenuated left channel reference and/or an attenuated right channel reference that predicts speaker output and/or echo associated with the one or more speakers 109a-n. The simulated echo signal may be utilized for residual echo suppression associated with the hard-panned-configured AEC processing filter 306 and/or the soft-panned-configured AEC processing filter 308. For example, the simulated echo signal may be utilized to modify one or more sub-bands associated with residual echo suppression. Additionally or alternatively, the simulated echo signal may be utilized to modify one or more sub-bands associated with non-linear processing of the stereo audio signal 106.

FIG. 7 illustrates a flowchart diagram of an example process 700 for determining a near-end-audio state based on the reference state determined by the process 600, according to one or more embodiments of the present disclosure. For example, the near-end-audio state may be a near-end-talking state, a near-end-music state, or another type of near-end-audio state. The process 700 may be performed by the stereo reference scoring logic 302 of the stereo AEC unit 104.

At operation 702, the stereo reference scoring logic 302 may determine whether input from a microphone (e.g., the one or more microphones 101a-n) is detected. For example, the stereo reference scoring logic 302 may determine whether the stereo audio signal 106 is generated. If input from the microphone is detected, the stereo reference scoring logic 302 may determine at operation 704 whether the reference state for the stereo audio signal 106 corresponds to the "LEFT_REF_TALK" label associated with the left reference signal being detected for the stereo audio signal 106. If the reference state for the stereo audio signal 106 corresponds to the "LEFT_REF_TALK" label, the stereo reference scoring logic 302 may determine at operation 706 whether the left audio channel is converged and that left audio channel-to-filter output comparison criteria is satisfied. If yes, the stereo reference scoring logic 302 may determine at operation 708 that the left audio channel for the stereo audio signal 106 is associated with near-end talk (e.g., the left audio channel for the stereo audio signal 106 comprises audio). If no, the stereo reference scoring logic 302 may determine at operation 709 that there is no near-end talk related to the stereo audio signal 106.

If input from the microphone is detected, the stereo reference scoring logic 302 may determine at operation 710 whether the reference state for the stereo audio signal 106 corresponds to the "RIGHT_REF_TALK" label associated with the right reference signal being detected for the stereo audio signal 106. If the reference state for the stereo audio signal 106 corresponds to the "RIGHT_REF_TALK" label, the stereo reference scoring logic 302 may determine at operation 712 whether the right audio channel is converged and that right audio channel-to-filter output comparison criteria is satisfied. If yes, the stereo reference scoring logic 302 may determine at operation 714 that the right audio channel for the stereo audio signal 106 is associated with near-end talk (e.g., the right audio channel for the stereo audio signal 106 comprises audio). If no, the stereo reference scoring logic 302 may determine at operation 709 that there is no near-end talk related to the stereo audio signal 106.

In certain examples, the near-end-audio state may be utilized to control one or more latency operations with respect to the hard-panned-configured AEC processing filter 306 and/or the soft-panned-configured AEC processing filter 308. For example, the near-end-audio state may be utilized to control one or more filter taps of the hard-panned-configured AEC processing filter 306 and/or the soft-panned-configured AEC processing filter 308.

In certain examples, the near-end-audio state may additionally or alternatively be utilized to control a training rate for the hard-panned-configured AEC processing filter 306 and/or the soft-panned-configured AEC processing filter 308. In one example, a training rate for the hard-panned-configured AEC processing filter 306 and/or the soft-panned-configured AEC processing filter 308 may be reset in response to a determination that the near-end-audio state indicates that the left audio channel or the right audio channel is associated with near-end audio.

If input from the microphone is detected, the stereo reference scoring logic 302 may also determine at operation 716 whether the reference state for the stereo audio signal 106 corresponds to the "DOUBLE_REF_TALK" label associated with the left reference signal and the right reference signal being detected for the stereo audio signal 106. If the reference state for the stereo audio signal 106 corresponds to the "DOUBLE_REF_TALK" label, the stereo reference scoring logic 302 may determine at operation 718 whether both the left audio channel and the right audio channel (e.g., combo) are converged, and whether combo audio channel-to-filter output comparison criteria is satisfied. If yes, the stereo reference scoring logic 302 may determine at operation 720 that both the left audio channel and the right audio channel for the stereo audio signal 106 are associated with near-end talk (e.g., both the left audio channel and the right audio channel for the stereo audio signal 106 comprise audio). If no, the stereo reference scoring logic 302 may determine at operation 709 that there is no near-end talk related to the stereo audio signal 106.

FIG. 8 illustrates a flowchart diagram of an example process 800 for determining whether a reference signal for the stereo audio signal 106 is hard-panned or soft-panned based on the reference state determined by the process 600, according to one or more embodiments of the present disclosure. At operation 802, the stereo reference scoring logic 302 may determine whether the reference state for the stereo audio signal 106 corresponds to the "LEFT_REF_TALK" label or the "RIGHT_REF_TALK" label. If the reference state for the stereo audio signal 106 corresponds to either the "LEFT_REF_TALK" label or the "RIGHT_REF_TALK" label, a reference panning confidence (e.g., the stereo reference score) may be updated to indicate a hard-panned state for the stereo reference score at operation 804.

At operation 806, the stereo reference scoring logic 302 may also determine whether the reference state for the stereo audio signal 106 corresponds to the "DOU-BLE_REF_TALK" label. If yes, the stereo reference scoring logic 302 may determine whether coherence between the left audio channel and the right audio channel satisfies a coherence threshold (e.g., coherence is high). If the reference state for the stereo audio signal 106 corresponds to the "DOUBLE_REF_TALK" label and coherence is determined to satisfy the coherence threshold, a reference panning confidence (e.g., the stereo reference score) may be updated to indicate a soft-panned state for the stereo reference score at operation 810.

FIG. 9 illustrates a flowchart diagram of an example process 900 for determining whether a reference signal for the stereo audio signal 106 is hard-panned or soft-panned based on a panning confidence value for the stereo reference score, according to one or more embodiments of the present disclosure. At operation 902, the stereo reference scoring logic 302 may determine whether a reference panning confidence value is above an upper threshold value. If the reference panning confidence value is determined to be above the upper threshold value, the reference signal for the stereo audio signal 106 may be determined to be hard-panned at operation 904. The stereo reference scoring logic 302 may also determine, at operation 906, whether a reference panning confidence value is below a lower threshold value. If the reference panning confidence value is determined to be below the lower threshold value, the reference signal for the stereo audio signal 106 may be determined to be soft-panned at operation 908.

FIG. 10 illustrates a graph 1000 associated with energy detection, according to one or more embodiments of the present disclosure. The graph 1000 includes an observed audio signal 1002. The observed audio signal 1002 may correspond to a first channel sample portion (e.g., the left channel sample portion 106*a*) or a second channel sample portion (e.g., the right channel sample portion 106*b*) of the stereo audio signal 106. In one or more examples, energy detection associated with the observed audio signal 1002 may be determined based on an audio signal floor 1004 and an audio signal energy threshold 1006. According to various examples, the observed audio signal 1002 is determined to be associated with detected audio in response to the observed audio signal 1002 satisfying the audio signal energy threshold 1006. In a non-limiting example, a difference between the audio signal floor 1004 and the audio signal energy threshold 1006 may be between 4 dB and 10 dB (e.g., 8 dB).

FIG. 11 illustrates a graph 1100 associated with stereo reference scoring, according to one or more embodiments of the present disclosure. In one or more examples, a stereo reference score 1102 for the stereo audio signal 106 may be determined based on a hard-panned reference threshold 1104 and a soft-panned reference threshold 1106. In an example, the hard-panned-configured AEC processing filter 306 may be applied to the stereo audio signal 106 based on the stereo reference score 1102 satisfying the hard-panned reference threshold 1104. In another example, the soft-panned-configured AEC processing filter 308 may be applied to the stereo audio signal 106 based on the stereo reference score 1102 satisfying the soft-panned reference threshold 1106. In a non-limiting example, the hard-panned reference threshold 1104 may be equal to or approximately equal to a 0.63 stereo reference score value. Furthermore, in a non-limiting example, the soft-panned reference threshold 1106 may be equal to or approximately equal to a 0.37 stereo reference score value.

FIG. 12 illustrates a system 1200 for determining a convergence state associated with the stereo audio signal 106, according to one or more embodiments of the present disclosure. In an example, correlation is determined between a first channel sample portion (e.g., the left channel sample portion 106*a*) and/or a second channel sample portion (e.g., the right channel sample portion 106*b*) of the stereo audio signal 106 based on a comparison 1201 between the stereo audio signal 106 and filter output 1202 associated with AEC processing. For example, the comparison 1201 between the stereo audio signal 106 and filter output 1202 may be a microphone-to-filter comparison to predict the correlation. In one or more examples, the stereo reference score for the stereo audio signal 106 may be updated based on the correlation between the first channel sample portion and/or the second channel sample portion. For example, in response to a determination that error 1204 between the stereo audio signal 106 and filter output 1202 satisfies a defined error threshold value, the stereo reference scoring logic 302 may determine that a high degree of correlation exists.

FIG. 13 illustrates a system 1300 for providing adaptive acoustic echo cancellation for the stereo audio signal 106, according to one or more embodiments of the present disclosure. The system includes the audio processing apparatus 202 configured to provide logic and/or functionality to control an AEC filter 1322 and/or an AEC filter 1324 in order to provide adaptive acoustic echo cancellation for the stereo audio signal 106 comprised of the left channel sample portion 106*a* and the right channel sample portion 106*b*. The audio processing apparatus 202 may also be configured to perform one or more techniques described in FIGS. 1-11 and/or one or more other techniques described herein. In one or more examples, the audio processing apparatus 202 may be embedded in the audio processing pipeline 102. For example, the stereo AEC unit 104, the stereo reference scoring logic 302, and/or the AEC adaptive filtering logic 304 may correspond to or be integrated within the audio processing apparatus 202.

It is to be appreciated that the left channel sample portion 106*a* may correspond to at least a portion of audio output via the speaker 109*a* and the right channel sample portion 106*b* may correspond to at least a portion of audio output via the speaker 109*n*. In various examples, the speaker 109*a* and the speaker 109*n* may be located within an audio environment 1301. The audio environment 1301 may be an indoor environment, a conferencing environment, a video chat environment, a room, a performance hall, a broadcasting environment, a sports stadium or arena, an outdoor environment, a virtual environment, or another type of audio environment. In various examples, the audio processing apparatus 202 may be configured to provide adaptive acoustic echo cancellation for the audio environment 1301 via stereo reference scoring of with respect to the left channel sample portion 106*a* and the right channel sample portion 106*b* to adaptively configure AEC filtering via the AEC filter 1322 and/or the AEC filter 1324. In various examples, the stereo audio signal 106 comprised of the left channel sample portion 106*a* and the right channel sample portion 106*b* may be captured via a microphone 101 located within the audio environment 1301.

To provide the adaptive acoustic echo cancellation, the audio processing apparatus 202 may receive the left channel sample portion 106*a* and the right channel sample portion 106*b* of the stereo audio signal 106 respectively provided to the AEC filter 1322 and the AEC filter 1324. For example, the left channel sample portion 106a provided to the AEC filter 1322 and the right channel sample portion 106b provided to the AEC filter 1324 may also be provided to the audio processing apparatus 202 to allow the audio processing apparatus 202 to adaptively configure the AEC filter 1322 and/or the AEC filter 1324 to provide adaptive acoustic echo cancellation for the stereo audio signal 106 comprised of the left channel sample portion 106a and the right channel sample portion 106b. In an example, the audio processing apparatus 202 may configure the AEC filter 1322 and the AEC filter 1324 as the hard-panned-configured AEC processing filter 306 (e.g., the AEC filter 1322 may be configured as the mono AEC filter 402 and the AEC filter 1324 may be configured as the mono AEC filter 404). In another example, the audio processing apparatus 202 may configure the AEC filter 1322 and the AEC filter 1324 as the soft-panned-configured AEC processing filter 308 (e.g., the AEC filter 1322 may be configured as the stereo AEC filter 502 and the AEC filter 1324 may be configured as the stereo AEC filter 504).

Based on the stereo reference scoring logic 302, and/or the AEC adaptive filtering logic 304, the audio processing apparatus 202 may generate learning rate data 1326a to adaptively configure the AEC filter 1322 and/or learning rate data 1326b to adaptively configure the AEC filter 1324. The learning rate data 1326a may correspond to a learning rate of the AEC filter 1322 and the learning rate data 1326b may correspond to a learning rate of the AEC filter 1324. If a value of the learning rate data 1326a and/or the learning rate data 1326b is zero, then corresponding filter output of the AEC filter 1322 and/or the AEC filter 1324 may be zero. For example, if a value of the learning rate data 1326a is zero, a value of first filter output 1303 of the AEC filter 1322 may be zero, effectively turning off the AEC filter 1322. Similarly, if a value of the learning rate data 1326b is zero, a value of second filter output 1305 of the AEC filter 1324 may be zero, effectively turning off the AEC filter 1324.

A value of the learning rate data 1326a and/or a value of the learning rate data 1326b may be configured based on at least one or more techniques described in FIGS. 5-8. In one or more examples, a value of the learning rate data 1326a may be set to zero in response to a determination that double-talk and/or no reference activity is detected with respect to the left channel sample portion 106a. Furthermore, a value of the learning rate data 1326b may be set to zero in response to a determination that no reference activity and/or no double-talk is detected with respect to the right channel sample portion 106b. Additionally or alternatively, a value of the learning rate data 1326a and/or the learning rate data 1326b may be set to zero in response to a determination that no microphone activity is detected with respect to the microphone 101.

Double-talk may be detected in response to a determination that a reference signal is only detected with respect to the left channel sample portion 106a or a reference activity is only detected with respect to the right channel sample portion 106b. For example, a reference signal may be detected for the left channel sample portion 106a if convergence for the left channel sample portion 106a is not in a diverged state and/or if the first filter output 1303 is lower than the stereo audio signal 106 provided by the microphone 101 by a certain amount. Furthermore, a reference signal may be detected for the right channel sample portion 106b if convergence for the right channel sample portion 106b is not in a diverged state and/or if the second filter output 1305 is lower than the stereo audio signal 106 provided by the microphone 101 by a certain amount.

Additionally or alternatively, double-talk may be detected in response to a determination that a reference signal is detected with respect to the left channel sample portion 106a and the right channel sample portion 106b. Additionally or alternatively, double-talk may be detected in response to a determination that a reference signal is not detected with respect to both the left channel sample portion 106a and the right channel sample portion 106b. For example, if combined convergence for the left channel sample portion 106a and the right channel sample portion 106b is not in a diverged state and/or the filter output 1202 provided by a filter combiner element 1336 that combines the first filter output 1303 and the second filter output 1305 is lower than the stereo audio signal 106 provided by the microphone 101 by a certain amount, double-talk may be detected.

In various examples, correlation is determined between the left channel sample portion 106a and the right channel sample portion 106b based on the comparison 1201 between the filter output 1202 and output of the microphone 101. For example, the comparison 1201 may be between the filter output 1202 and the stereo audio signal 106. The comparison 1201 between the filter output 1202 and output of the microphone 101 (e.g., the stereo audio signal 106) may be a microphone-to-filter comparison to predict the correlation. In one or more examples, in response to a determination that the error 1204 between the filter output 1202 and output of the microphone 101 (e.g., the stereo audio signal 106) satisfies a defined error threshold value, the audio processing apparatus 202 may determine that a high degree of correlation exists.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time.

In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 14 is a flowchart diagram of an example process 1400, for adaptive stereo AEC processing, in accordance with, for example, the audio processing apparatus 202. Via the various operations of process 1400, the audio processing apparatus 202 may enhance accuracy, efficiency, reliability and/or effectiveness of suppressing acoustic feedback (e.g., echo) from stereo audio signals. The process 1400 begins at operation 1402 where a stereo reference score for the stereo audio signal is determined based on a first channel sample portion of the stereo audio signal. The first channel sample portion may be a left channel sample portion of the stereo audio signal. Alternatively, the first channel sample portion may be a right channel sample portion of the stereo audio signal. The stereo reference score may be utilized to select between hard-panned-configured AEC processing and soft-panned-configured AEC processing. At operation 1404, the stereo reference score is updated based on a second channel sample portion of the stereo audio signal. The second channel sample portion may be a right channel sample portion of the stereo audio signal. Alternatively, the second channel sample portion may be a left channel sample portion of the stereo audio signal. At operation 1406, the stereo reference score for the stereo audio signal is compared to a hard-panned reference threshold. At operation 1408, a hard-panned-configured AEC processing filter or a soft-panned-configured AEC processing filter is applied to the stereo audio signal depending on whether the stereo reference score satisfies the hard-panned reference threshold. For instance, in response to determining that the stereo reference score satisfies the hard-panned reference threshold, the hard-panned-configured AEC processing filter is applied to the stereo audio signal to generate a filtered audio signal output. In response to determining that the stereo reference score satisfies a soft-panned reference threshold, the soft-panned-configured AEC processing filter is applied to the stereo audio signal to generate a filtered audio signal output.

In some examples, in response to determining that the stereo reference score satisfies the hard-panned reference threshold, the process 1400 adapts one or more filters for the hard-panned-configured AEC processing filter to generate a filtered audio signal output. In some examples, in response to determining that the stereo reference score satisfies the hard-panned reference threshold, the process 1400 provides the stereo audio signal to a first filter associated with first mono AEC processing and a second filter associated with second mono AEC processing to generate a filtered audio signal output. In some examples, in response to determining that the stereo reference score satisfies a soft-panned reference threshold, the process 1400 combines a first filter and a second filter associated with stereo AEC processing to generate a filtered audio signal output.

FIG. 15 illustrates an audio processing control user interface 1500 according to one or more embodiments of the present disclosure. The audio processing control user interface 1500 may be, for example, an electronic interface (e.g., a graphical user interface) of a client device. For example, the audio processing control user interface 1500 may be a client device interface, a web user interface, a mobile application interface, or the like. In one or more examples, the audio processing control user interface 1500 includes an AEC interface 1502. The AEC interface 1502 may be utilized to configure a first AEC input 1503 and a second AEC input 1505. For example, the first AEC input 1503 may be related to the left channel sample portion 106a and the second AEC input 1505 may be related to the right channel sample portion 106b. Additionally, the AEC interface 1502 may provide an audio output visualization 1507. For example, the audio output visualization 1507 may be a meter interface that visually indicates a degree of AEC provided by the audio processing apparatus 202. In an example, the audio output visualization 1507 may be configured as an Echo Return Loss Enhancement (ERLE) associated with a degree of echo removal associated with the stereo audio signal 106 comprised of the left channel sample portion 106a and the right channel sample portion 106b.

FIG. 16 illustrates an audio processing control user interface 1600 according to one or more embodiments of the present disclosure. The audio processing control user interface 1600 may be, for example, an electronic interface (e.g., a graphical user interface) of a client device. For example, the audio processing control user interface 1600 may be a client device interface, a web user interface, a mobile application interface, or the like. In one or more examples, the audio processing control user interface 1600 includes visualizations such as audio processing controls 1602 and/or audio processing controls 1604 to facilitate adaptive acoustic echo cancellation for audio related to the first AEC input 1503 and the second AEC input 1505. In one or more examples, the left and right audio channels related to the first AEC input 1503 and the second AEC input 1505 may be independently routed to different output channels associated with the audio processing controls 1602 and/or audio processing controls 1604.

FIG. 17 illustrates an audio processing control user interface 1700 according to one or more embodiments of the present disclosure. The audio processing control user interface 1700 may be, for example, an electronic interface (e.g., a graphical user interface) of a client device. For example, the audio processing control user interface 1700 may be a client device interface, a web user interface, a mobile application interface, or the like. In one or more examples, the audio processing control user interface 1700 includes an AEC interface 1702. The AEC interface 1702 may include an interface element 1704 to configure stereo audio for the first AEC input 1503 and the second AEC input 1505. For example, the interface element 1704 may be utilized to select mono audio or stereo audio for the first AEC input 1503 and the second AEC input 1505.

FIG. 18 is a flowchart diagram of an example process 1800, for adaptive stereo AEC processing, in accordance with, for example, the audio processing apparatus 202. Via the various operations of process 1800, the audio processing apparatus 202 may enhance accuracy, efficiency, reliability and/or effectiveness of suppressing acoustic feedback (e.g., echo) from stereo audio signals. The process 1800 begins at operation 1802 where, based at least in part on detecting a reference signal associated with a channel sample portion of a stereo audio signal associated with at least one microphone, a panning state of the stereo audio signal is determined. In some examples, determining the panning state includes determining a stereo reference score based at least in part on a first channel sample portion of the stereo audio signal, updating the stereo reference score based on a second channel sample portion of the stereo audio signal, and/or comparing the stereo reference score for the stereo audio signal to a hard-panned reference threshold. In some examples, determining the panning state additionally includes, in response to determining that the stereo reference score satisfies the hard-panned reference threshold, determining that the panning state is hard-panned. In some examples, determining the panning state additionally includes, in a response to determining that the stereo reference score satisfies a soft-panned reference threshold, determining that the panning state is soft-panned. At operation 1804, a hard-panned-configured AEC processing filter or a soft-panned-configured AEC processing filter is applied to the stereo audio signal to generate a filtered audio signal output based at least in part on the panning state. Additionally, at operation 1806, the filtered audio signal output is outputted.

In some examples, the process 1800 additionally or alternatively includes determining a first energy detection score for the first channel sample portion, determining a second energy detection score for the second channel sample portion, comparing the first energy detection score and the second energy detection score to an energy detection threshold, and/or updating the stereo reference score for the stereo audio signal based on the first energy detection score or the second energy detection score satisfying the energy detection threshold.

In some examples, the process 1800 additionally or alternatively includes determining a correlation between the first channel sample portion and the second channel sample portion based on a comparison between the stereo audio signal and filter output associated with AEC processing. In some examples, the process 1800 additionally or alternatively includes updating the stereo reference score for the stereo audio signal based on the correlation between the first channel sample portion and the second channel sample portion.

In some examples, the process 1800 additionally or alternatively includes, based on the stereo reference score satisfying the hard-panned reference threshold, adapting one or more filters for the hard-panned-configured AEC processing filter to generate the first filtered audio signal output.

In some examples, the process 1800 additionally or alternatively includes, based on the stereo reference score satisfying the soft-panned reference threshold, combining a first filter and a second filter associated with stereo AEC processing to generate the second filtered audio signal output.

Although example processing systems have been described in the figures herein, implementations of the subject matter and the functional operations described herein may be implemented in other types of digital electronic circuitry, or in computer software, firmware, or hardware, including the structures disclosed in this specification and their structural equivalents, or in combinations of one or more of them.

Embodiments of the subject matter and the operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer programs, i.e., one or more modules of computer program instructions, encoded on computer-readable storage medium for execution by, or to control the operation of, information/data processing apparatus. Alternatively, or in addition, the program instructions may be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium may be, or be included in, a computer-readable storage device, a computer-readable storage substrate, a random or serial access memory array or device, or a combination of one or more of them. Moreover, while a computer-readable storage medium is not a propagated signal, a computer-readable storage medium may be a source or destination of computer program instructions encoded in an artificially-generated propagated signal. The computer-readable storage medium may also be, or be included in, one or more separate physical components or media (e.g., multiple CDs, disks, or other storage devices).

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

While this specification contains many specific implementation details, these should not be construed as limitations on the scope of any disclosures or of what may be claimed, but rather as description of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain examples, multitasking and parallel processing may be advantageous. Moreover, the separation of various system components in the embodiments described above should not be understood as requiring such separation in all embodiments, and it should be understood that the described program components and systems may generally be integrated together in a product or packaged into multiple products.

The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. An audio processing apparatus configured to adaptively provide acoustic echo cancellation (AEC) for a stereo audio signal associated with at least one microphone, the audio processing apparatus comprising at least one processor and a memory storing instructions that are operable, when executed by the at least one processor, to cause the audio processing apparatus to: determine, based at least in part on detecting a reference signal associated with a channel sample portion of the stereo audio signal, a panning state of the stereo audio signal.

Clause 2. The audio processing apparatus of clause 1, wherein the instructions are further operable to cause the audio processing apparatus to: based at least in part on the panning state, apply a hard-panned-configured AEC processing filter to the stereo audio signal to generate a first filtered audio signal output or apply a soft-panned-configured AEC processing filter to the stereo audio signal to generate a second filtered audio signal output.

Clause 3. The audio processing apparatus of any one of clauses 1-2, wherein the hard-panned-configured-AEC processing filter is configured for mono-channel processing via one or more mono AEC filters and wherein the soft-panned-configured-AEC processing filter is configured for stereo-channel processing via two mono AEC filters.

Clause 4. The audio processing apparatus of any one of clauses 1-3, wherein the instructions are further operable to cause the audio processing apparatus to: output the first filtered audio signal output or second filtered audio signal output to an audio output device.

Clause 5. The audio processing apparatus of any one of clauses 1-4, wherein the instructions are further operable to cause the audio processing apparatus to: determine a stereo reference score based at least in part on a first channel sample portion of the stereo audio signal.

Clause 6. The audio processing apparatus of any one of clauses 1-5, wherein the instructions are further operable to cause the audio processing apparatus to: update the stereo reference score based on a second channel sample portion of the stereo audio signal.

Clause 7. The audio processing apparatus of any one of clauses 1-6, wherein the instructions are further operable to cause the audio processing apparatus to: compare the stereo reference score for the stereo audio signal to a hard-panned reference threshold.

Clause 8. The audio processing apparatus of any one of clauses 1-7, wherein the instructions are further operable to cause the audio processing apparatus to: in response to determining that the stereo reference score satisfies the hard-panned reference threshold, determine that the panning state is hard-panned.

Clause 9. The audio processing apparatus of any one of clauses 1-8, wherein the instructions are further operable to cause the audio processing apparatus to: in a response to determining that the stereo reference score satisfies a soft-panned reference threshold, determine that the panning state is soft-panned.

Clause 10. The audio processing apparatus of any one of clauses 5-9, wherein the instructions are further operable to cause the audio processing apparatus to: determine a first energy detection score for the first channel sample portion.

Clause 11. The audio processing apparatus of any one of clauses 5-10, wherein the instructions are further operable to cause the audio processing apparatus to: determine a second energy detection score for the second channel sample portion.

Clause 12. The audio processing apparatus of any one of clauses 5-11, wherein the instructions are further operable to cause the audio processing apparatus to: compare the first energy detection score and the second energy detection score to an energy detection threshold.

Clause 13. The audio processing apparatus of any one of clauses 5-12, wherein the instructions are further operable to cause the audio processing apparatus to: update the stereo reference score for the stereo audio signal based on the first energy detection score or the second energy detection score satisfying the energy detection threshold.

Clause 14. The audio processing apparatus of any one of clauses 5-13, wherein the instructions are further operable to cause the audio processing apparatus to: determine a correlation between the first channel sample portion and the second channel sample portion based on a comparison between the stereo audio signal and filter output associated with AEC processing.

Clause 15. The audio processing apparatus of any one of clauses 5-14, wherein the instructions are further operable to cause the audio processing apparatus to: update the stereo reference score for the stereo audio signal based on the correlation between the first channel sample portion and the second channel sample portion.

Clause 16. The audio processing apparatus of any one of clauses 5-15, wherein the instructions are further operable to cause the audio processing apparatus to: based on the stereo reference score satisfying the hard-panned reference threshold, adapt one or more filters for the hard-panned-configured AEC processing filter to generate the first filtered audio signal output.

Clause 17. The audio processing apparatus of any one of clauses 5-16, wherein the instructions are further operable to cause the audio processing apparatus to: based on the stereo reference score satisfying the hard-panned reference threshold, input the stereo audio signal to a first filter associated with first mono AEC processing and a second filter associated with second mono AEC processing to generate the first filtered audio signal output.

Clause 18. The audio processing apparatus of any one of clauses 5-17, wherein the instructions are further operable to cause the audio processing apparatus to: based on the stereo reference score satisfying the soft-panned reference threshold, combine a first filter and a second filter associated with stereo AEC processing to generate the second filtered audio signal output.

Clause 19. The audio processing apparatus of any one of clauses 5-18, wherein the instructions are further operable to cause the audio processing apparatus to: based on the stereo reference score satisfying the soft-panned reference threshold, determine a panning confidence value for the stereo reference score.

Clause 20. The audio processing apparatus of any one of clauses 5-19, wherein the instructions are further operable to cause the audio processing apparatus to: based on the stereo reference score satisfying the soft-panned reference threshold, compare the panning confidence value to a threshold confidence value associated with the hard-panned-configured AEC processing filter.

Clause 21. The audio processing apparatus of clause 20, wherein the instructions are further operable to cause the audio processing apparatus to: in response to a determination that the panning confidence value is above the threshold confidence value, apply the hard-panned-configured AEC processing filter to the stereo audio signal to generate the first filtered audio signal output.

Clause 22. The audio processing apparatus of clause 21, wherein the instructions are further operable to cause the audio processing apparatus to: in response to a determination that the panning confidence value is below the threshold confidence value, apply the soft-panned-configured AEC processing filter to the stereo audio signal to generate the second filtered audio signal output.

Clause 23. The audio processing apparatus of any one of clauses 5-22, wherein the instructions are further operable to cause the audio processing apparatus to: determine a stereo reference state for the stereo audio signal based on the first channel sample portion and the second channel sample portion.

Clause 24. The audio processing apparatus of any one of clauses 5-23, wherein the instructions are further operable to cause the audio processing apparatus to: in response to a first determination that the stereo reference state corresponds to a left audio channel, adapt residual echo suppression for the hard-panned-configured AEC processing filter based on the left audio channel to generate the first filtered audio signal output.

Clause 25. The audio processing apparatus of any one of clauses 5-24, wherein the instructions are further operable to cause the audio processing apparatus to: in response to a second determination that the stereo reference state corresponds to a right audio channel, adapt residual echo suppression for the hard-panned-configured AEC processing filter based on the right audio channel to generate the first filtered audio signal output.

Clause 26. The audio processing apparatus of any one of clauses 5-25, wherein the instructions are further operable to cause the audio processing apparatus to: based on the stereo reference score satisfying the soft-panned reference threshold, alter a training rate for one or more filters for the hard-panned-configured AEC processing filter.

Clause 27. The audio processing apparatus of any one of clauses 1-26, wherein the hard-panned-configured AEC processing filter comprises one or more adaptive filters configured for AEC processing of hard-panned or soft-panned stereo audio signals.

Clause 28. The audio signal processing apparatus of any one of clauses 1-27, wherein the audio processing apparatus performs a computer-implemented method related to any one of clauses 1-27.

Clause 29. The audio signal processing apparatus of any one of clauses 1-27, wherein a computer program product, stored on a computer readable medium, comprising instructions that, when executed by one or more processors of the audio processing apparatus, cause the one or more processors to perform one or more operations related to any one of clauses 1-27.

Clause 30. An audio processing apparatus configured to adaptively provide AEC for a stereo audio signal associated with at least one microphone, the audio processing apparatus comprising at least one processor and a memory storing instructions that are operable, when executed by the at least one processor, to cause the audio processing apparatus to: determine a stereo reference score for the stereo audio signal based on a first channel sample portion of the stereo audio signal.

Clause 31. The audio processing apparatus of clause 30, wherein the instructions are further operable to cause the audio processing apparatus to: update the stereo reference score based on a second channel sample portion of the stereo audio signal.

Clause 32. The audio processing apparatus of any one of clauses 30-31, wherein the instructions are further operable to cause the audio processing apparatus to: compare the stereo reference score for the stereo audio signal to a hard-panned reference threshold.

Clause 33. The audio processing apparatus of any one of clauses 30-32, wherein the instructions are further operable to cause the audio processing apparatus to: apply a hard-panned-configured AEC processing filter to the stereo audio signal to generate a first filtered audio signal output based on the stereo reference score satisfying the hard-panned reference threshold.

Clause 34. The audio processing apparatus of any one of clauses 30-33, wherein the instructions are further operable to cause the audio processing apparatus to: apply a soft-panned-configured AEC processing filter to the stereo audio signal to generate a second filtered audio signal output based on the stereo reference score satisfying a soft-panned reference threshold.

Clause 35. The audio signal processing apparatus of any one of clauses 30-34, wherein the audio processing apparatus performs a computer-implemented method related to any one of clauses 30-34.

Clause 36. The audio signal processing apparatus of any one of clauses 30-34, wherein a computer program product, stored on a computer readable medium, comprising instructions that, when executed by one or more processors of the audio processing apparatus, cause the one or more processors to perform one or more operations related to any one of clauses 30-34.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An audio processing apparatus configured to adaptively provide acoustic echo cancellation (AEC) for a stereo audio signal associated with at least one microphone, the audio processing apparatus comprising at least one processor and a memory storing instructions that are operable, when executed by the at least one processor, to cause the audio processing apparatus to:
   determine a panning confidence value for a channel sample portion of the stereo audio signal;
   determine, based at least in part on the panning confidence value, a panning state associated with a hard-panned reference or a soft-panned reference for the stereo audio signal;
   based at least in part on the panning state, apply a hard-panned-configured AEC processing filter to the stereo audio signal to generate a first filtered audio signal output or apply a soft-panned-configured AEC processing filter to the stereo audio signal to generate a second filtered audio signal output, wherein the hard-panned-configured AEC processing filter is configured for mono-channel processing via one or more mono AEC filters and wherein the soft-panned-configured AEC processing filter is configured for stereo-channel processing via two mono AEC filters; and
   output the first filtered audio signal output or the second filtered audio signal output to an audio output device.

2. The audio processing apparatus of claim 1, wherein the instructions are further operable to cause the audio processing apparatus to:
   determine a stereo reference score based at least in part on a first channel sample portion of the stereo audio signal;
   update the stereo reference score based on a second channel sample portion of the stereo audio signal;
   compare the stereo reference score for the stereo audio signal to a hard-panned reference threshold for the hard-panned reference;
   in response to determining that the stereo reference score satisfies the hard-panned reference threshold, determine that the panning state is hard-panned; and
   in response to determining that the stereo reference score satisfies a soft-panned reference threshold for the soft-panned reference, determine that the panning state is soft-panned.

3. The audio processing apparatus of claim 2, wherein the instructions are further operable to cause the audio processing apparatus to:
   determine a first energy detection score for the first channel sample portion;
   determine a second energy detection score for the second channel sample portion;
   compare the first energy detection score and the second energy detection score to an energy detection threshold; and
   update the stereo reference score for the stereo audio signal based on the first energy detection score or the second energy detection score satisfying the energy detection threshold.

4. The audio processing apparatus of claim 2, wherein the instructions are further operable to cause the audio processing apparatus to:
   determine a correlation between the first channel sample portion and the second channel sample portion based on a comparison between the stereo audio signal and filter output associated with AEC processing; and
   update the stereo reference score for the stereo audio signal based on the correlation between the first channel sample portion and the second channel sample portion.

5. The audio processing apparatus of claim 2, wherein the instructions are further operable to cause the audio processing apparatus to:
   based on the stereo reference score satisfying the hard-panned reference threshold, adapt one or more filters for the hard-panned-configured AEC processing filter to generate the first filtered audio signal output.

6. The audio processing apparatus of claim 2, wherein the instructions are further operable to cause the audio processing apparatus to:
   based on the stereo reference score satisfying the hard-panned reference threshold, input the stereo audio signal to a first filter associated with first mono AEC processing and a second filter associated with second mono AEC processing to generate the first filtered audio signal output.

7. The audio processing apparatus of claim 2, wherein the instructions are further operable to cause the audio processing apparatus to:
   based on the stereo reference score satisfying the soft-panned reference threshold, combine a first filter and a second filter associated with stereo AEC processing to generate the second filtered audio signal output.

8. The audio processing apparatus of claim 2, wherein the instructions are further operable to cause the audio processing apparatus to:
   based on the stereo reference score satisfying the soft-panned reference threshold:
      determine the panning confidence value for the stereo reference score; and
      compare the panning confidence value to a threshold confidence value associated with the hard-panned-configured AEC processing filter.

9. The audio processing apparatus of claim 8, wherein the instructions are further operable to cause the audio processing apparatus to:
   in response to a determination that the panning confidence value is above the threshold confidence value, apply the hard-panned-configured AEC processing filter to the stereo audio signal to generate the first filtered audio signal output.

10. The audio processing apparatus of claim 9, wherein the instructions are further operable to cause the audio processing apparatus to:
    in response to a determination that the panning confidence value is below the threshold confidence value, apply the soft-panned-configured AEC processing filter to the stereo audio signal to generate the second filtered audio signal output.

11. The audio processing apparatus of claim 2, wherein the instructions are further operable to cause the audio processing apparatus to:
    determine a stereo reference state for the stereo audio signal based on the first channel sample portion and the second channel sample portion;

in response to a first determination that the stereo reference state corresponds to a left audio channel, adapt residual echo suppression for the hard-panned-configured AEC processing filter based on the left audio channel to generate the first filtered audio signal output; and in response to a second determination that the stereo reference state corresponds to a right audio channel, adapt residual echo suppression for the hard-panned-configured AEC processing filter based on the right audio channel to generate the first filtered audio signal output.

12. The audio processing apparatus of claim 2, wherein the instructions are further operable to cause the audio processing apparatus to:

based on the stereo reference score satisfying the soft-panned reference threshold, alter a training rate for one or more filters for the hard-panned-configured AEC processing filter.

13. The audio processing apparatus of claim 1, wherein the hard-panned-configured AEC processing filter comprises one or more adaptive filters configured for AEC processing of hard-panned or soft-panned stereo audio signals.

14. A computer-implemented method performed by an audio processing apparatus configured to adaptively provide acoustic echo cancellation (AEC) for a stereo audio signal associated with at least one microphone, comprising:

determining a panning confidence value for a channel sample portion of the stereo audio signal;

determining, based at least in part on the panning confidence value, a panning state associated with a hard-panned reference or a soft-panned reference for the stereo audio signal;

applying a hard-panned-configured AEC processing filter or a soft-panned-configured AEC processing filter to the stereo audio signal to generate a filtered audio signal output based at least in part on the panning state; and outputting the filtered audio signal output.

15. The computer-implemented method of claim 14, wherein determining the panning state comprises:

determining a stereo reference score based at least in part on a first channel sample portion of the stereo audio signal;

updating the stereo reference score based on a second channel sample portion of the stereo audio signal;

comparing the stereo reference score for the stereo audio signal to a hard-panned reference threshold for the hard-panned reference;

in response to determining that the stereo reference score satisfies the hard-panned reference threshold, determining that the panning state is hard-panned; and in response to determining that the stereo reference score satisfies a soft-panned reference threshold for the soft-panned reference, determining that the panning state is soft-panned.

16. The computer-implemented method of claim 15, further comprising:

determining a first energy detection score for the first channel sample portion;

determining a second energy detection score for the second channel sample portion;

comparing the first energy detection score and the second energy detection score to an energy detection threshold; and updating the stereo reference score for the stereo audio signal based on the first energy detection score or the second energy detection score satisfying the energy detection threshold.

17. The computer-implemented method of claim 15, further comprising:

determining a correlation between the first channel sample portion and the second channel sample portion based on a comparison between the stereo audio signal and filter output associated with AEC processing; and updating the stereo reference score for the stereo audio signal based on the correlation between the first channel sample portion and the second channel sample portion.

18. The computer-implemented method of claim 15, further comprising:

based on the stereo reference score satisfying the hard-panned reference threshold, adapting one or more filters for the hard-panned-configured AEC processing filter to generate the filtered audio signal output.

19. The computer-implemented method of claim 15, further comprising:

based on the stereo reference score satisfying the soft-panned reference threshold, combining a first filter and a second filter associated with stereo AEC processing to generate the filtered audio signal output.

20. A computer program product, stored on a computer readable medium, comprising instructions that, when executed by one or more processors of an audio processing apparatus configured to adaptively provide acoustic echo cancellation (AEC) for a stereo audio signal associated with at least one microphone, cause the one or more processors to:

determine a panning confidence value for a channel sample portion of the stereo audio signal;

determine, based at least in part on the panning confidence value, a panning state associated with a hard-panned reference or a soft-panned reference for the stereo audio signal;

based at least in part on the panning state, apply a hard-panned-configured AEC processing filter to the stereo audio signal to generate a first filtered audio signal output or apply a soft-panned-configured AEC processing filter to the stereo audio signal to generate a second filtered audio signal output, wherein the hard-panned-configured AEC processing filter is configured for mono-channel processing via one or more mono AEC filters and wherein the soft-panned-configured AEC processing filter is configured for stereo-channel processing via two mono AEC filters; and output the first filtered audio signal output or the second filtered audio signal output to an audio output device.

* * * * *